(12) United States Patent
Hawkins et al.

(10) Patent No.: US 12,491,004 B2
(45) Date of Patent: Dec. 9, 2025

(54) FLEXIBLE SURGICAL ACCESS PORT

(71) Applicant: Medos International Sarl, Le Locle (CH)

(72) Inventors: John Riley Hawkins, Cumberland, RI (US); Jörn Richter, Kandern (DE); Eric Buehlmann, Duxbury, MA (US); Daniel Thommen, Liestal (CH); Roger Berger, Büren (CH)

(73) Assignee: Medos International Sarl, Le Locle (CH)

( * ) Notice: Subject to any disclaimer, the term of this patent is extended or adjusted under 35 U.S.C. 154(b) by 89 days.

(21) Appl. No.: 17/510,709

(22) Filed: Oct. 26, 2021

(65) Prior Publication Data

US 2023/0128242 A1    Apr. 27, 2023

(51) Int. Cl.
*A61B 17/34* (2006.01)
*A61B 17/32* (2006.01)
*A61B 90/00* (2016.01)
*A61B 17/00* (2006.01)

(52) U.S. Cl.
CPC .. *A61B 17/3423* (2013.01); *A61B 17/320016* (2013.01); *A61B 90/361* (2016.02); *A61B 2017/00862* (2013.01)

(58) Field of Classification Search
CPC ............ A61B 17/3421; A61B 17/3423; A61B 17/320016; A61B 90/361; A61B 17/0218
See application file for complete search history.

(56) References Cited

U.S. PATENT DOCUMENTS

| | | |
|---|---|---|
| 6,814,715 B2 | 11/2004 | Bonutti et al. |
| 7,479,150 B2 | 1/2009 | Rethy et al. |
| 7,976,464 B2 | 7/2011 | Shluzas et al. |
| 7,981,132 B2 | 7/2011 | Dubrul et al. |
| 8,105,382 B2 | 1/2012 | Olmos et al. |
| 8,343,065 B2 | 1/2013 | Bartol et al. |
| 8,343,079 B2 | 1/2013 | Bartol et al. |
| 8,372,131 B2 | 2/2013 | Hestad et al. |
| 8,517,954 B2 | 8/2013 | Bartol et al. |
| 8,855,822 B2 | 10/2014 | Bartol et al. |
| 8,882,679 B2 | 11/2014 | Bartol et al. |
| 8,892,259 B2 | 11/2014 | Bartol et al. |
| 8,942,797 B2 | 1/2015 | Bartol et al. |
| 8,979,767 B2 | 3/2015 | Bartol et al. |
| 8,983,593 B2 | 3/2015 | Bartol et al. |
| 8,992,558 B2 | 3/2015 | Stone et al. |
| 9,039,630 B2 | 5/2015 | Bartol et al. |

(Continued)

FOREIGN PATENT DOCUMENTS

| | | |
|---|---|---|
| EP | 1702575 A2 | 9/2006 |
| EP | 2582296 A1 | 4/2013 |

(Continued)

*Primary Examiner* — Si Ming Ku
(74) *Attorney, Agent, or Firm* — BakerHostetler

(57) ABSTRACT

A flexible surgical access port is provided that includes a flexible body. The flexible body is configured to elastically expand in response to passage of a surgical equipment therethrough, and thus retracts as the surgical equipment moves past. Thus, the flexible body can provide a surgical access path through Kambin's Triangle, and large surgical equipment passed through the flexible body does not compress the exiting nerve or the traversing nerve root for a prolonged period of time.

15 Claims, 18 Drawing Sheets

(56) References Cited

U.S. PATENT DOCUMENTS

| | | | |
|---|---|---|---|
| 9,084,550 B1 | 7/2015 | Bartol et al. | |
| 9,254,143 B2 | 2/2016 | Huynh et al. | |
| 9,265,526 B1 | 2/2016 | Abdou | |
| 9,301,711 B2 | 4/2016 | Bartol et al. | |
| 9,486,605 B2 | 11/2016 | Ravichandran et al. | |
| 9,498,249 B2 | 11/2016 | Bonutti et al. | |
| 9,510,885 B2 | 12/2016 | Burger et al. | |
| 9,717,403 B2* | 8/2017 | Kleiner | A61B 1/00154 |
| 10,321,833 B2 | 6/2019 | Wybo | |
| 10,376,208 B2 | 8/2019 | Wybo | |
| 10,376,209 B2 | 8/2019 | Wybo | |
| 10,449,002 B2 | 10/2019 | Wybo | |
| 2003/0195405 A1 | 10/2003 | Marino et al. | |
| 2006/0041270 A1 | 2/2006 | Lenker et al. | |
| 2006/0212062 A1 | 9/2006 | Farascioni | |
| 2007/0032703 A1 | 2/2007 | Sankaran et al. | |
| 2008/0183044 A1 | 7/2008 | Colleran et al. | |
| 2008/0262302 A1 | 10/2008 | Azarbarzin et al. | |
| 2009/0024158 A1 | 1/2009 | Viker | |
| 2009/0024203 A1* | 1/2009 | Hestad | A61B 17/3431 623/1.15 |
| 2009/0105788 A1 | 4/2009 | Bartol et al. | |
| 2010/0049003 A1* | 2/2010 | Levy | A61B 17/3439 600/199 |
| 2010/0312189 A1 | 12/2010 | Shelton, IV et al. | |
| 2011/0264098 A1 | 10/2011 | Cobbs | |
| 2013/0066158 A1 | 3/2013 | Rodriguez | |
| 2013/0204270 A1 | 8/2013 | Howard et al. | |
| 2014/0058284 A1 | 2/2014 | Bartol et al. | |
| 2014/0058288 A1 | 2/2014 | Bartol et al. | |
| 2015/0051506 A1 | 2/2015 | Wybo et al. | |
| 2015/0051507 A1 | 2/2015 | Wybo et al. | |
| 2015/0088029 A1 | 3/2015 | Wybo | |
| 2015/0257746 A1 | 9/2015 | Seifert | |
| 2017/0065269 A1* | 3/2017 | Thommen | A61B 1/00154 |
| 2017/0172557 A9 | 6/2017 | Stone et al. | |
| 2019/0076167 A1* | 3/2019 | Fantuzzi | A61B 17/3439 |

FOREIGN PATENT DOCUMENTS

| | | |
|---|---|---|
| WO | 2009/012265 A2 | 1/2009 |
| WO | 2011/130532 A2 | 10/2011 |
| WO | 2011/159883 A1 | 12/2011 |
| WO | 2011/159885 A2 | 12/2011 |
| WO | 2011/159886 A1 | 12/2011 |
| WO | 2016/105214 A2 | 6/2016 |
| WO | 2017/219010 A1 | 12/2017 |

* cited by examiner

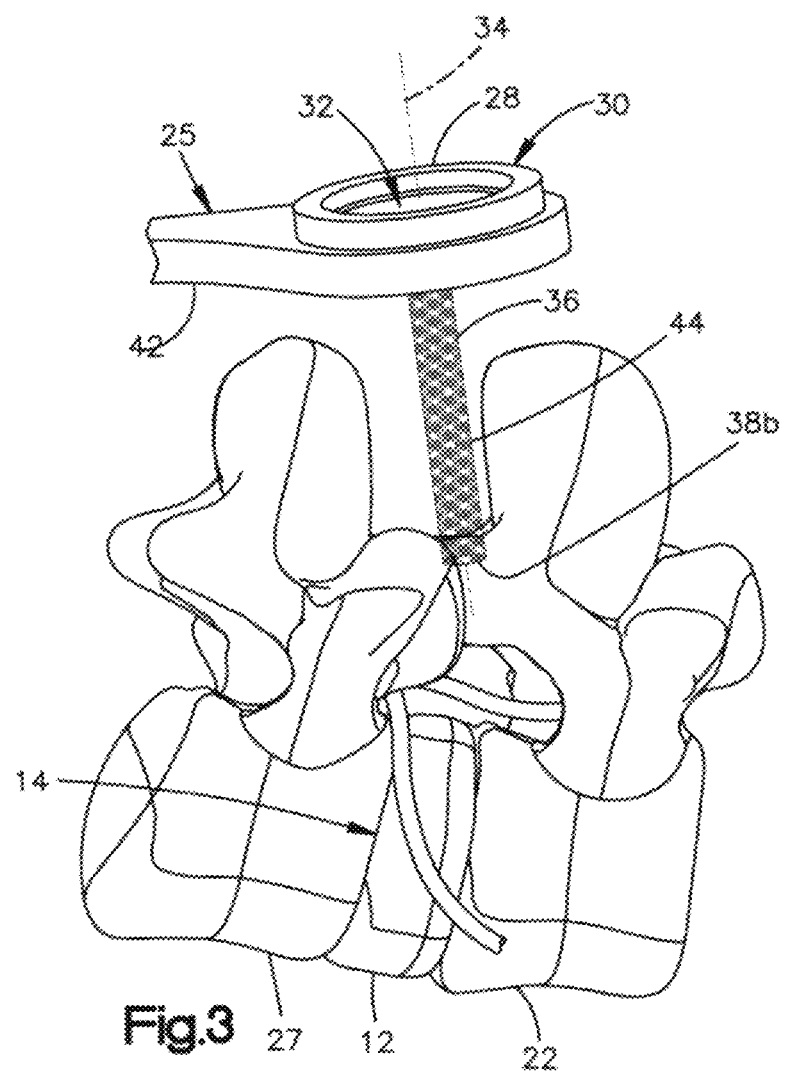

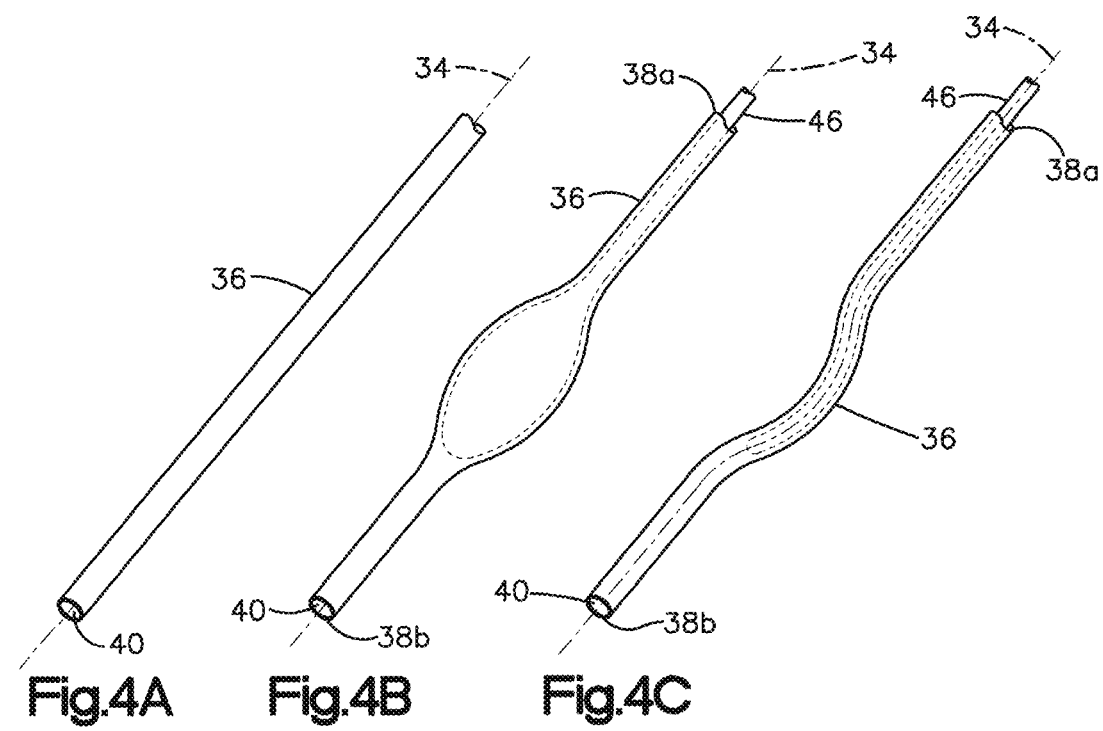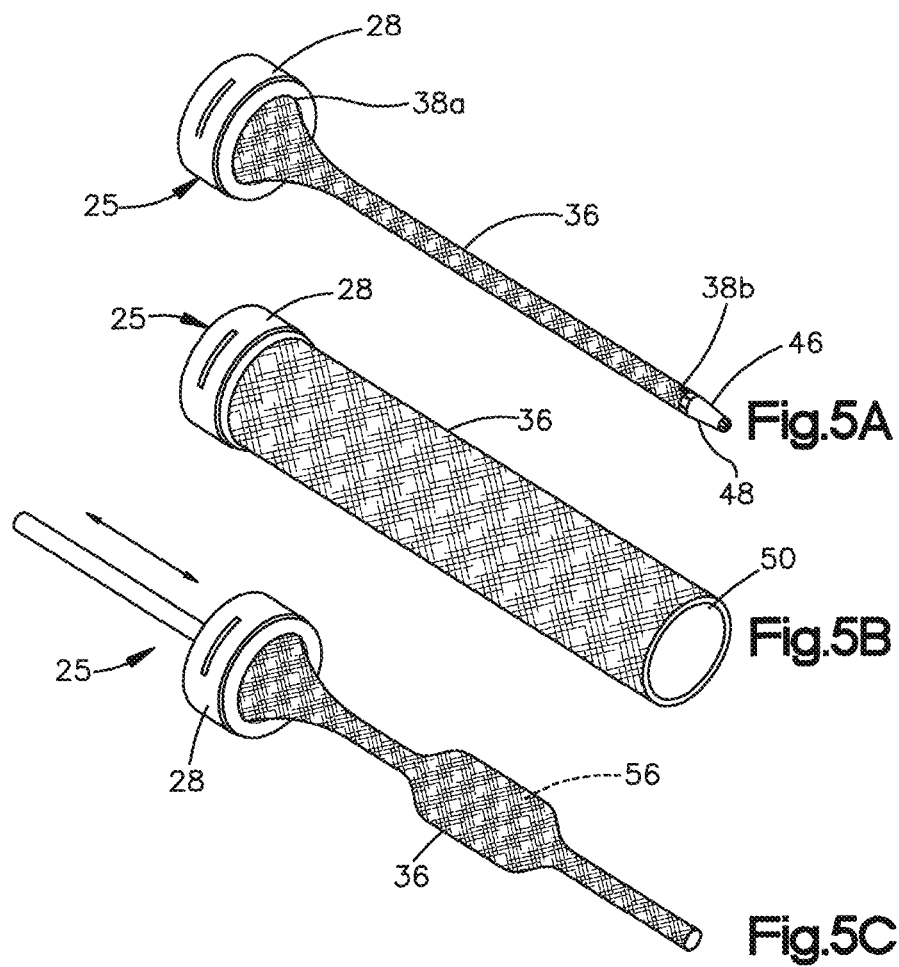

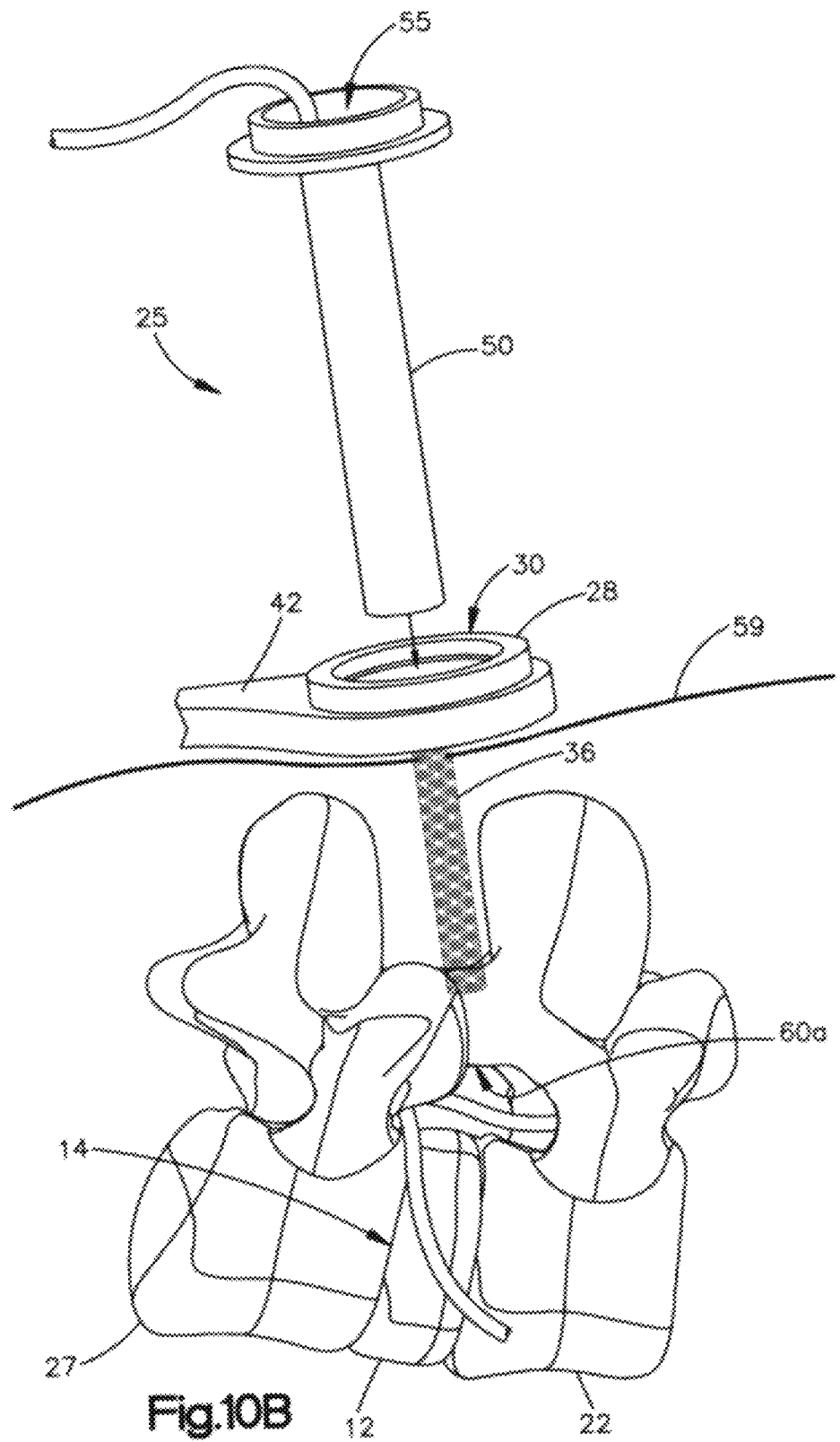

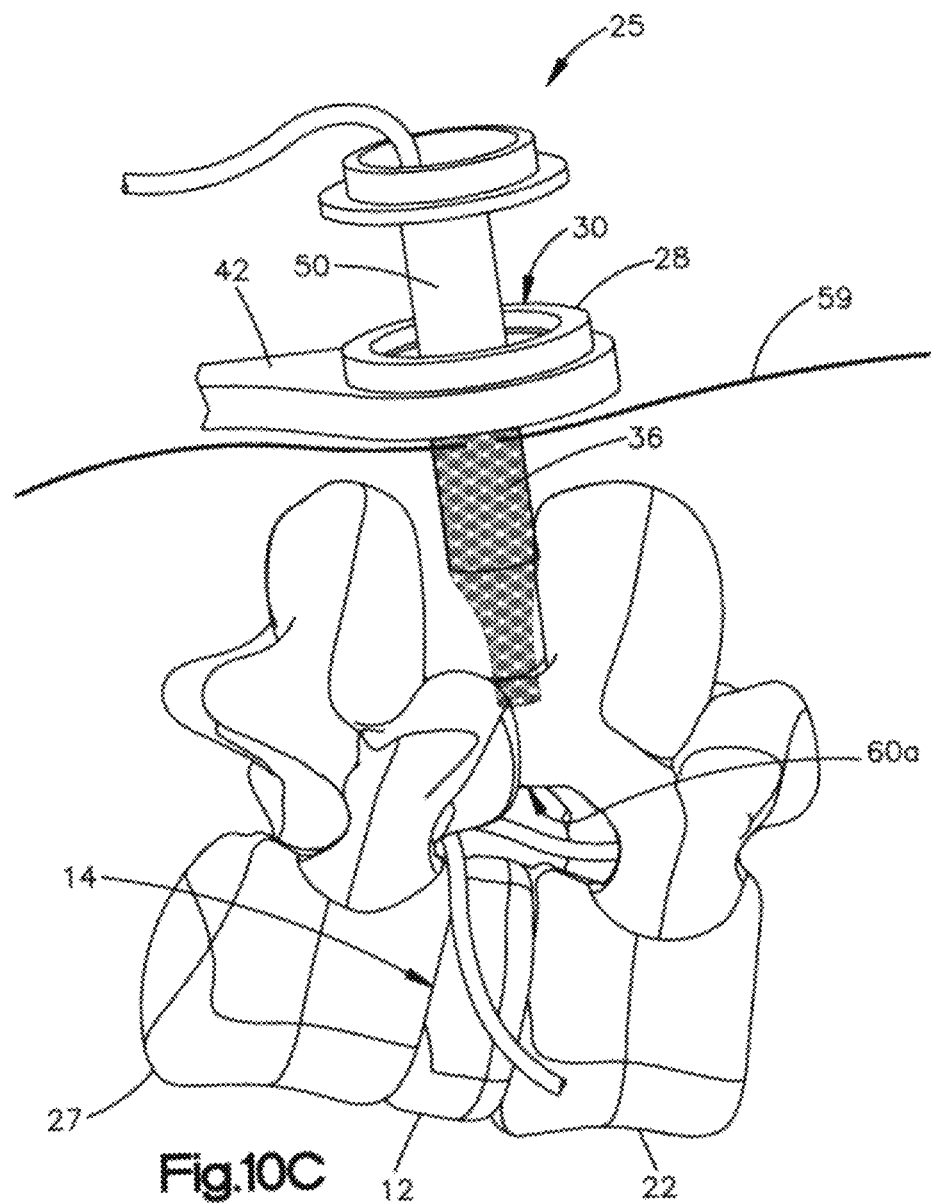

FLEXIBLE SURGICAL ACCESS PORT

FIELD

This disclosure relates generally to devices and methods for providing surgical access, e.g., using flexible surgical access ports. Such devices and methods can be used in various procedures, e.g., orthopedic or neurologic surgical procedures such as spinal fusion surgery.

BACKGROUND

Surgical procedures are used to treat and cure a wide range of diseases, conditions, and injuries. Surgery often requires access to internal tissue through open or minimally invasive surgical procedures. The term "minimally invasive" refers to all types of minimally invasive surgical procedures, including endoscopic, laparoscopic, arthroscopic, natural orifice intraluminal, and natural orifice transluminal procedures, and procedures performed under microscope. Minimally invasive surgery can have numerous advantages compared to traditional open surgical procedures, including reduced trauma, faster recovery, reduced risk of infection, and reduced scarring.

Whether minimally invasive or not, there are a number of surgical procedures in which it can be desirable to form a working channel in a patient to provide access to a surgical site within the patient. One such example is orthopedic or neurologic surgical procedures, including, e.g., spinal fusion procedures that access the vertebrae and/or the intervertebral discs disposed between adjacent vertebrae, posterior structures, foraminal spaces, and the like. In such procedures, it is desirable to protect the instrumentation and implants associated with the procedure from becoming contaminated.

Prior techniques for providing such a working channel can have a variety of drawbacks. For example, insertion of rigid access ports of a fixed size can require larger incisions and deformation of surrounding tissue, which can damage the tissue such as sensitive neural tissue, and can lead to micro-ischemic tissue damage. Further, rigid access ports are sized according to the largest instrument or implant that is passed therethrough, even if the largest instrument is only used once or for a short time during a procedure. Therefore, rigid access ports can maximally deform tissue for the duration of a procedure even if the majority of a procedure does not require such a large size access channel.

Accordingly, there is a need for improved access ports that can address the above-noted and other deficiencies of the prior ports.

SUMMARY

In one example, a flexible surgical access port can include a collar that defines a bore, and a flexible body that extends from the collar along a central axis, the flexible surgical access port defining a lumen along an entirety of its length that is in communication with the bore of the collar. The flexible surgical access port can be configured to expand and contract in a radial direction perpendicular to the longitudinal axis from a first dimension to a second dimension as objects having a radial dimension greater than the first dimension are passed through the inner lumen.

Any of the features or variations described above can be applied to any particular aspect or embodiment of the present disclosure in a number of different combinations. The absence of explicit recitation of any particular combination is due solely to the avoidance of repetition in this summary.

BRIEF DESCRIPTION OF THE DRAWINGS

FIG. 3 is a perspective view of one example of a flexible surgical access port positioned to access a target surgical location;

FIG. 4A is a perspective view of the flexible surgical access port of FIG. 3 constructed in accordance with one example;

FIG. 4B is a perspective view of the flexible surgical access port of FIG. 4A conforming to an irregular shape;

FIG. 4C is a perspective view of the flexible surgical access port of FIG. 4A conforming to an alternative irregular shape;

FIG. 5A is a perspective view of an access assembly including a guide member inserted into the flexible surgical access port of FIG. 4A;

FIG. 5B is a perspective view of an access assembly including an access cannula inserted into the flexible surgical access port of FIG. 4A;

FIG. 5C is a perspective view of an access assembly including an intervertebral implant being driven through the flexible surgical access port of FIG. 4A;

FIG. 10B is a perspective view of one embodiment of a cannula aligned for insertion through the flexible surgical access port of FIG. 10A;

FIG. 10C is a perspective view of the cannula of FIG. 10B being inserted into the flexible surgical access port;

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments. The features illustrated or described in connection with one exemplary embodiment may be combined with the features of other embodiments. Such modifications and variations are intended to be included within the scope of the present disclosure.

Additionally, to the extent that linear or circular dimensions are used in the description of the disclosed devices and methods, such dimensions are not intended to limit the types of shapes that can be used in conjunction with such devices and methods. A person skilled in the art will recognize that an equivalent to such linear and circular dimensions can easily be determined for any geometric shape. Further, in the present disclosure, like-numbered components of the embodiments generally have similar features. Still further, sizes and shapes of the devices, and the components thereof, can depend at least on the anatomy of the subject in which the devices will be used, the size and shape of components with which the devices will be used, and the methods and procedures in which the devices will be used.

Certain embodiments disclosed herein are discussed in the context of an intervertebral implant and spinal fusion because of the device and methods have applicability and usefulness in such a field. The device can be used for fusion, for example, by inserting an intervertebral implant to properly space adjacent vertebrae in situations where a disc has ruptured or otherwise been damaged. "Adjacent" vertebrae can include those vertebrae originally separated only by a disc or those that are separated by intermediate vertebra and discs. Such embodiments can therefore be used to create proper disc height and spinal curvature as required in order to restore normal anatomical locations and distances. However, it is contemplated that the teachings and embodiments disclosed herein can be beneficially implemented in a variety of other operational settings, for spinal surgery and otherwise.

Figure 1:
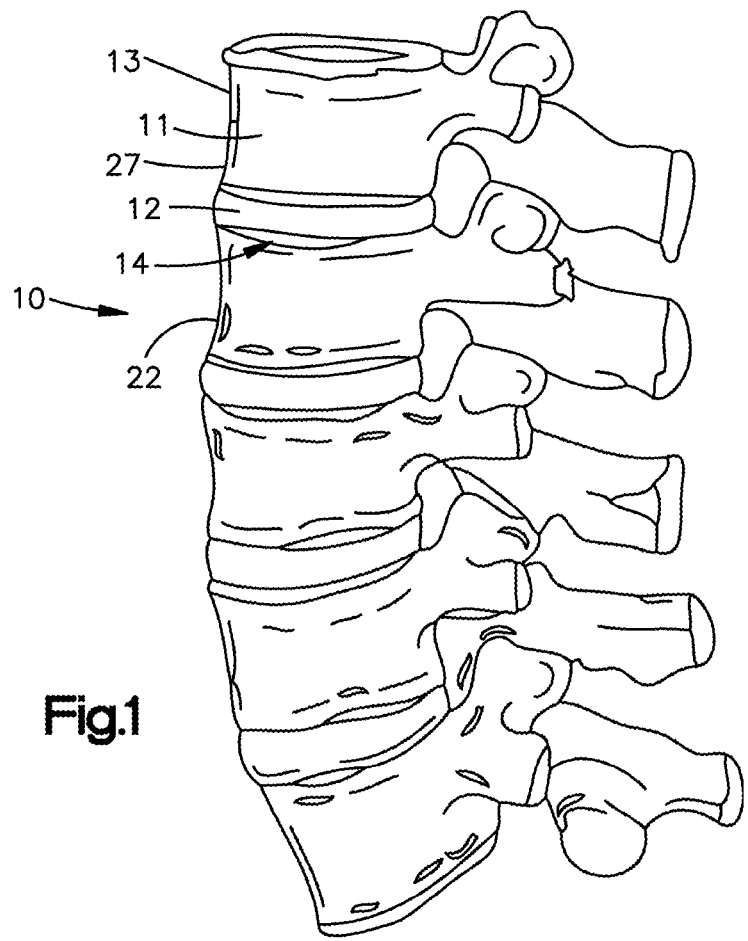
FIG. 1 is a lateral elevation view of a portion of a vertebral column.

As context for the methods and devices described herein, FIG. 1 is a lateral view of a vertebral column 10. As shown in FIG. 1, the vertebral column 10 comprises a series of alternative vertebrae 11 having vertebrae 13. Adjacent vertebrae 13 define respective disc spaces 14 that contain respective fibrous intervertebral discs 12. Healthy discs 12 provide axial support and movement to the upper portions of the body. The vertebral column 10 typically comprises thirty-three vertebrae 11, with seven cervical (C1-C7), twelve thoracic (T1-T12), five lumbar (LI-LS), five fused sacral (S1-S5), and four fused coccygeal vertebrae.

Figure 2:
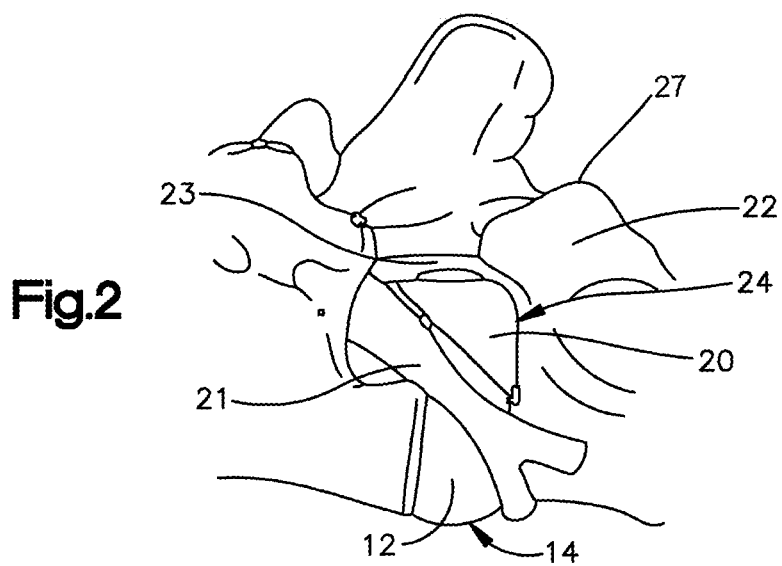
FIG. 2 is a schematic side view of Kambin's triangle.

FIG. 2 is a schematic view of Kambin's triangle 24. This region 20 is the site of posterolateral access for spinal surgery. It can be defined as a right triangle over the intervertebral disc 12 viewed dorsolaterally. The hypotenuse is the exiting nerve 21, the base is the superior border of the inferior vertebra 22, and the height is the traversing nerve root 23. In some examples, the intervertebral disc space 14, and thus the disc 12, can be accessed by performing a foraminoplasty in which a portion of the inferior vertebra 22 is removed such that surgical equipment, such as surgical instruments or implants can be introduced through the Kambin's triangle 24. The intervertebral disc space 14 is defined by the vertebrae of the inferior vertebra 22 and a superior vertebra 27 that is opposite the inferior vertebra 22. The portion of the inferior vertebra 22 that is removed can be defined by the superior articular process of the inferior vertebra 22. In such a procedure, it is often desired to protect the exiting nerve and the traversing nerve root. Apparatus and methods for accessing the intervertebral disc through Kambin's triangle 24 may involve performing endoscopic foraminoplasty while protecting the nerve will be discussed in more detail below. Utilizing foraminoplasty to access the intervertebral disc 12 through Kambin's triangle 24 can have several advantages (e.g., less or reduced trauma to the patient) as compared to accessing the intervertebral disc posteriorly or anteriorly as is typically done in the art. In particular, surgical procedures involving posterior access often require removal of the facet joint. For example, transforaminal interbody lumbar fusion (TLIF) typically involves removal of one facet joint to create an expanded access path to the intervertebral disc. Removal of the facet joint can be very painful for the patient, and is associated with increased recovery time. In contrast, accessing the intervertebral disc through Kambin's triangle 24 may advantageously avoid the need to remove the facet joint. As described in more detail below, endoscopic foraminoplasty may provide for expanded access to the intervertebral disc without removal of a facet joint. Sparing the facet joint may reduce patient pain and blood loss associated with the surgical procedure. In addition, sparing the facet joint can advantageously permit the use of certain posterior fixation devices which utilize the facet joint for support (e.g., trans-facet screws, trans-pedicle screws, and/or pedicle screws). In this manner, such posterior fixation devices can be used in combination with interbody devices inserted through the Kambin's triangle 24.

Referring now to FIG. 3, a surgical access system 25 includes a flexible surgical access port 30 that is configured to provide an access path to the spine through Kambin's triangle 24. The flexible surgical access device port 30 can include a collar 28 and a flexible surgical access body 36 that extends generally distally from the collar 28. The collar 28 can be configured as an annulus that defines a bore 32 open to the flexible body 36 The bore 32 can be cylindrical or alternatively shaped as desired. Further, the collar 28 can be rigid or flexible. The flexible body 36 extends from the collar 28 along a central axis 34. The flexible surgical access device port 30 can define a central axis 34 that extends through the flexible body 36. The flexible body 36 can define a proximal end 38a (see also FIG. 5A) and a distal end 38b that is opposite the proximal end 38a along the central axis 34. A lumen 40 (see FIG. 4A) can extend through the flexible surgical access port 30 from its proximal end to its distal end. Thus, the lumen 40 can also extend through the entire length of the flexible body 36 from the proximal end 38a to the distal end 38b along the central axis 34.

The proximal end 38a can be coupled to the collar 28 in any manner as desired, such that the lumen 40 is in communication with the bore 32 of the collar 28. In particular, a central axis of the bore 32 can be aligned with the central axis 34 of the flexible surgical access port 30. The surgical access system 25 can include a handle 42 that is configured to support the flexible surgical access port 30. In one example, the handle 42 can be coupled to the collar 28 in any suitable manner so as to direct the flexible surgical access port 30 toward a target location such as Kambin's triangle 24. Thus, an apparatus such as a surgical instrument or implant can be inserted distally through the bore 32 and into the lumen 40 toward the spine. The collar 28 can define a proximal end of the flexible surgical access port 30.

Referring now also to FIGS. 4A-4B, the flexible body 36, and thus the flexible surgical access port 30, can advantageously be configured to expand radially from a first configuration having first cross-sectional dimension to a second or expanded configuration having a second cross-sectional dimension that is greater than the first cross-sectional dimension. The first and second cross-sectional dimensions are measured along the same direction and can extend through the central axis 34. In some examples, the first and second cross-sectional dimensions can be configured as diameters when the flexible body 36 is circular in cross-section. The flexible body 36 can define any suitable shape as desired. The flexible body 36, and thus the flexible surgical access port 30, can be woven or nonwoven as desired. When woven, the flexible body 36 can be made from any suitable pattern of woven fibers 44 that define a weave pattern. Description of the flexible body 36 herein can apply with equal force and effect to the flexible surgical access port 30. In one example, the fibers 44 can be interwoven so as to define a mesh. In other examples, the fibers 44 can define a lattice. Thus, the fibers 44 can intersect at respective angles of intersection that can change as the flexible body 36 expands radially. Thus, one or more of the angles of intersection can be measured to determine a quantification of an outer diameter of the flexible body 36. In still other examples, the fibers 44 can be braided. For instance, the fibers 44 can be helically wound to define a braid (see FIG. 15).

During operation, the flexible body 36 can be collapsed in the first configuration, and can be urged to a normal relaxed geometric configuration. In the normal relaxed geometric configuration, the flexible body 36 is no longer collapsed, but has not been expanded beyond its normal relaxed geometric shape. For instance, when the flexible body 36 is configured as a cylindrical body, the flexible fibers 44 can be collapsed in the first configuration and thus not define a cylinder. The flexible body 36 can be urged to its normal and relaxed cylindrical geometric shape if desired. However, the flexible body 36 has not yet expanded. Thus, the first configuration can either be collapsed or in its normal relaxed geometric shape in the first configuration. The flexible body 36 is configured to expand beyond the first configuration to an expanded position whereby at least a portion of the flexible body is expanded beyond the normal relaxed geometric configuration. Expansion of the flexible body 36 to the second position can be along a direction that is perpendicular to the central axis 34.

The surgical access system 25 can include surgical equipment 46 that is configured to be driven distally through the lumen 40. The surgical equipment can have a cross-sectional dimension that is greater than the cross-sectional dimension of the flexible body when the flexible body is in the first configuration. The cross-sectional dimension of the surgical equipment 46 is oriented in the same direction as the cross-sectional dimension of the flexible body 36. Thus, the surgical equipment 46 apply a radially outward force that urges the flexible body 36 to expand to a second configuration that is beyond its normal relaxed geometric configuration. When the flexible body 36 defines a lattice structure, the surgical equipment can urge the flexible body 36 to vary the angles of intersection so as to expand the flexible body 36 to the second configuration. Thus, in some examples the flexible body 36 can expand to the second configuration without substantial expansion of the fibers 44 along their respective lengths. In this regard, the fibers 44 can be substantially rigid along their lengths.

In other examples the fibers 44 can be expandable along their lengths so as to expand flexible body 36. For instance, the fibers 44 can extend circumferentially about the central axis, such that expansion of the fibers 44 along their lengths causes the flexible body 36 to expand radially. For instance, the fibers 44 can be defined by an elastically deformable elastomer that can define a braid, a mesh, a lattice structure, or any suitable alternative woven structure as desired. Thus, elongation of the fibers 44 can contribute to the movement of the flexible body 36 from the first configuration to the second configuration. In other examples, the flexible body 36 can be nonwoven and made from an expandable material. The flexible body 36 can be elastic so as to move toward or to the first configuration after being expanded to the second configuration. In other examples, the flexible body 36 can be substantially inelastic such that compressive forces from surrounding anatomical tissue can cause the flexible body 36 to move toward or to the first configuration from the second configuration. The fibers can be made of Nickel-Titanium (NiTi) or any suitable alternative material as desired. In one example, the filaments can have a shape memory, such that as the flexible body is deflected into a desired shape, the flexible body remains in the desired shape.

The term "substantially," "approximately," and derivatives thereof, and words of similar import, when used to described sizes, shapes, spatial relationships, distances, directions, expansion, and other similar parameters includes the stated parameter in addition to a range up to 10% more and up to 10% less than the stated parameter, including up to 5% more and up to 5% less, including up to 3% more and up to 3% less, including up to 1% more and up to 1% less.

With continuing reference to FIGS. 4A-4C, the surgical equipment 46 can be sized to be inserted through the bore 32 of the collar 28 (see FIG. 3). Further, when the flexible body 36 is in the first configuration, the first cross-sectional dimension is less than the cross-sectional dimension of the bore 32 of the collar 28. Thus, when the surgical equipment 46 is driven through the bore 32 and into the lumen 40, the flexible body 36 expands to the second configuration whereby the second cross-sectional dimension is no greater than that of the bore 32 in some examples. In other examples, it is recognized that the surgical equipment 46 can be inserted through the bore 32 in a first orientation, and subsequently iterated to a second orientation in the lumen 40 that causes the lumen 40 to expand to the second cross-sectional dimension that is greater than the cross-sectional dimension of the bore 32. The flexible body 36 can abut at least a portion up to an entirety of the surgical equipment that caused the flexible body 36 to expand.

Accordingly, during operation, the surgical equipment 46 such as a surgical instrument or implant can be driven through the bore 32 and into the flexible body 36. The surgical equipment 46 can be sized to fit through the bore 32, and sized greater than the first cross-sectional dimension of the flexible body 36. Thus, as the surgical equipment 46 is driven through the lumen 40, a force from the surgical equipment 46 urges a local region of the flexible body 36 to expand radially from the first configuration to the second configuration. The local region can include an aligned location of the flexible body 36 that is aligned with the surgical equipment 46 and regions adjacent the aligned location that are urged to expand by the force from the surgical equipment 46 as it travels through the lumen 40. That is, the region of the flexible body 36 that are aligned with the surgical equipment 46 or adjacent the portion of the flexible body 36 that is aligned with the surgical equipment 46 can expand outward in order to enlarge the lumen 40 to accommodate the surgical equipment whose cross-sectional dimension is greater than that of the flexible body 36 when the flexible body is in the first configuration. Typically, the aligned region will expand a greater amount than the adjacent region. Once the force from the surgical equipment 46 is removed, the locations of the flexible body 36 that have expanded can return toward or to the first configuration. Remote regions of the flexible body 36 that are remote from the surgical equipment 46 can be in the first configuration.

Thus, as the surgical equipment 46 is driven through the lumen 40, previously expanded regions of the surgical equipment 46 can either remain in the second configuration or return from the second configuration toward or to the first configuration as the surgical equipment 46 travels distally along the lumen 40 a sufficient distance such that portions of the flexible body 36 that previously defined local regions now define remote regions, whereby the surgical equipment 46 no longer exerts a force on the remote regions sufficient to cause the remote regions to expand from the first configuration. The local regions 36 of the flexible body move distally as the surgical equipment is advanced distally in the lumen 40. Conversely, the local regions 36 of the flexible body 36 move proximally as the surgical equipment is advanced proximally in the lumen 40. As the surgical equipment 46 travels in the lumen 40, locations of the flexible body 36 that were urged by the surgical equipment 46 to expand to the second configuration can return toward or to the first configuration when the surgical equipment 46 has travelled to a position remote of the locations such that the locations define remote regions. Natural biasing forces of the flexible body 36 can urge the flexible body 36 toward or to the first configuration after the surgical equipment 46 has passed by. Therefore, the surgical equipment 46 urges the flexible body 36 to expand as the surgical equipment 46 travels distally and proximally, selectively, in the lumen 40. It should be appreciated that the local expansion of the flexible body 36 can thus be momentary, as the local regions become remote regions that then return toward or to the first configuration once the surgical equipment has passed by.

As a result, anatomical tissue surrounding the flexible body 36 undergoes only momentary compression due to the momentary expansion of the flexible body 36 from the first configuration to the second configuration. At some regions surrounding the flexible body 36, the surrounding anatomical tissue can include fatty tissue and musculature of the patient. At other regions of the flexible body 36, the surrounding tissue can include a nerve such as either or both of the exiting nerve 21 and the traversing nerve root 23 that partially define Kambin's triangle. Advantageously, large surgical equipment 46 can pass through the flexible body 36 while causing only momentary contact between the flexible body 36 and the nerve. A rigid conduit, on the contrary, that is sized to receive the large surgical equipment would bear against the nerve for as long as the conduit were in place during the surgical procedure. Thus, the surgical access system 25 prevents the nerve from undergoing prolonged compression during spinal surgery.

Referring now to FIG. 4C, the flexible body 36 can also be configured to deflect along a direction perpendicular to the central axis 34. Accordingly, when the surgical equipment 46 has a curvature and is inserted into the lumen 40, the surgical equipment 46 can correspondingly impart a curvature to the flexible body 36. Thus, the central axis 34 can extend along one or more curved paths. When the surgical equipment 46 is removed from the lumen 40, the flexible body 36 can return toward or to the first configuration. Alternatively or additionally, a surgical equipment 46 inserted into the lumen 40 along a direction that is angularly offset with respect to the central axis 34 in a select direction can cause either or both of at least a portion of the central axis 34 and the distal end of the flexible body 36 to correspondingly deflect in the select direction. Therefore, the surgical equipment 46 can change a trajectory of the lumen that is defined by a direction that separates the proximal end 38a to the distal end 38b from a first trajectory to a second trajectory. This can be advantageous when it is desired to perform one or more procedures on different areas of the spine. The flexible body 36 can define the first trajectory when it is in the first configuration. The distal end 38b of the flexible body 36 can also define the distal end of the flexible surgical access port 30.

Figure 6:
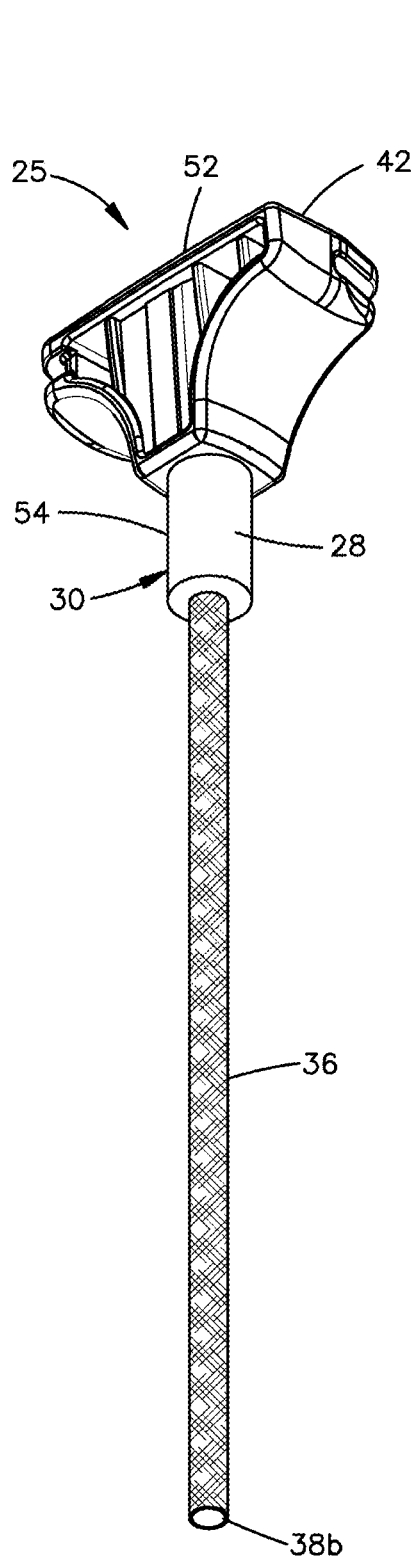
FIG. 6 is a perspective view of the flexible surgical access port of FIG. 4A in another example.
Figure 7:
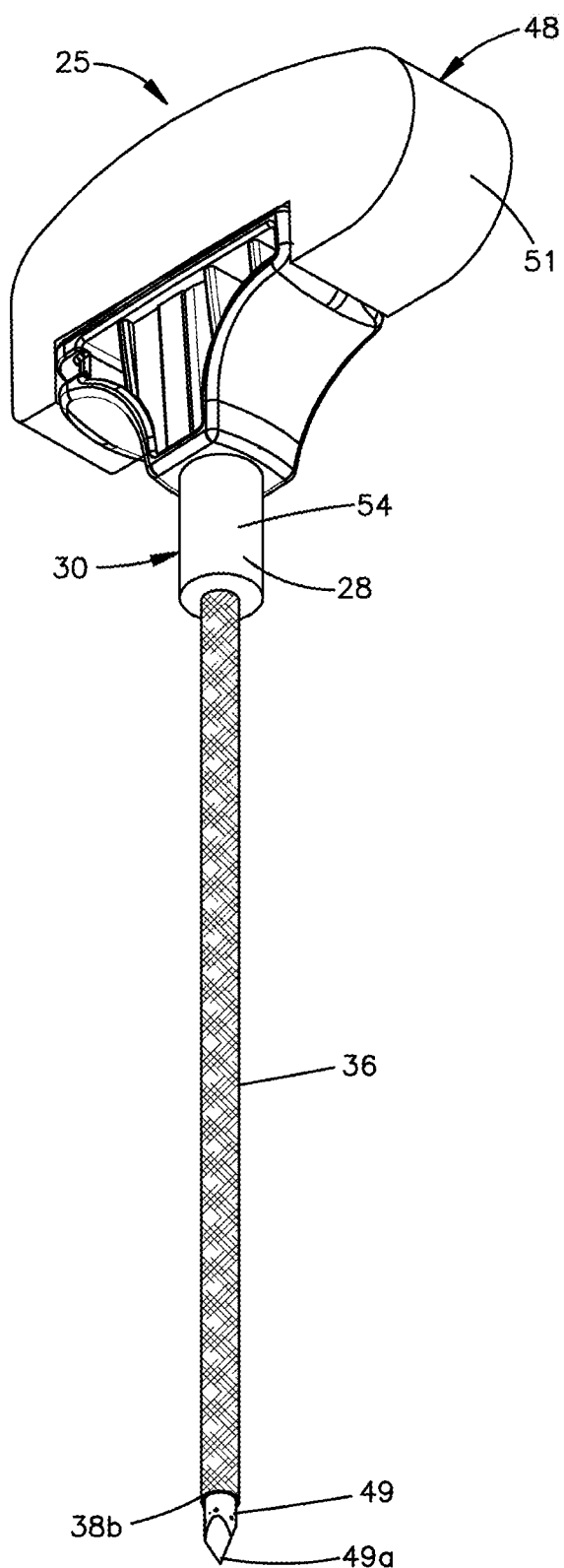
FIG. 7 is a perspective view of a portion of the flexible surgical access port of FIG. 6 showing insertion of a trocar therethrough.

Referring now to FIG. 5A, in some examples, the surgical equipment 46 of the surgical access system 25 can include a stylet 48 or any suitable alternative access member that can be configured to establish a trajectory to a target surgical location. The stylet 48 can be sized for insertion through the lumen 40. In some examples, the stylet 48 can extend through the lumen 40 while the flexible body 36 remains in the first configuration. In other examples, the stylet 48 can cause the flexible body 36 to expand beyond the first configuration to the second configuration. While the stylet 48 extends through the lumen 40, the stylet 48 can be driven through the anatomical soft tissue of the patient toward a target surgical location. Referring now also to FIGS. 6-7, the stylet 48 can include a stylet shaft 49 and a stylet handle 51. The stylet shaft 49 is sized to extend through the bore 32 of the collar 28 of the flexible surgical access port 30 (see also FIG. 3), which can be defined by either or both of a port handle 52 and a proximal port grommet 54 of the flexible surgical access port 30. The flexible body 36 can extend in the distal direction from the proximal port grommet 54. The proximal port grommet 54 can have an inner cross-sectional dimension such as a diameter that is equal to the expanded cross-sectional dimension of the flexible body 36. The flexible surgical access port 30 can further include a distal port grommet that extends distally from the flexible body 36 and has an inner cross-sectional dimension equal to that of the proximal port grommet 54. The stylet shaft 49 can be driven distally through the port handle 52 and the proximal port grommet 54 and through the lumen 40 so that a distal tapered tip 49a of the stylet shaft 49 extends distally past the distal end 38b of the flexible body 36. In one example, the target surgical location can be defined by the superior articular process. Alternatively or additionally, the target surgical location can be defined by the disc space. The stylet handle 51 can seat against or removably interlock with the port handle 52 when the stylet shaft 49 has been fully driven through the flexible body 36.

As illustrated in FIG. 5B, in some examples the surgical equipment of the surgical access system 25 can include an access cannula 50 that is rigid and defines a working channel 55 toward or to the target surgical location. The working channel 55 can define a cross-sectional dimension greater than the first cross-sectional dimension of the lumen 40 of the flexible surgical access port 36. Thus, the access cannula 50 causes the flexible surgical access port 36 to expand radially to the second configuration. It is recognized that the access cannula 50 can have an outer cross-sectional dimension greater than that of the stylet 48. As the access cannula 50 can radially expand an entirety of the flexible body 36 while the access cannula 50 is in use, the access cannula 50 can have particular applicability when accessing the target surgical location does not involve compression of nerves.

Referring to FIG. 5C, in some examples the surgical equipment of the surgical access system 25 can further include an intervertebral implant 56 that is sized to be driven distally through the lumen 40. The intervertebral implant 56 can be configured as a spinal fusion cage. Thus, the flexible body 36 can be configured to receive the intervertebral implant 56. The intervertebral implant 56 can travel through the lumen 40 and into the intervertebral disc space. The intervertebral implant 56 can cause the flexible body 36 to expand from the first configuration to the second configuration as the intervertebral implant 56 travels distally through the lumen 40. The implant 56 causes the flexible body 36 to expand 40 at regions adjacent the implant 56 as the implant 56 travels distally through the lumen 40. Regions of the flexible body 36 can return toward or to the first configuration after the intervertebral implant 56 has passed by distally. Thus, any nerves that are compressed due to expansion of the flexible body 36 are only compressed momentarily until the implant 56 has passed by distally.

It should be appreciated that the various surgical equipment of the surgical access system 25 can cause the flexible body 36 to expand radially different amounts from the first configuration, and all such degrees of expansion can define the second configuration. For instance, the stylet 48, the intervertebral implant 56, and the access cannula 50 can all be differently dimensioned. Thus, the maximum second cross-sectional dimension can be approximately four times the first cross-sectional dimension. By way of example, the flexible body 36 can define a first cross-sectional dimension of approximately 4 mm when in the first configuration, and can define a maximum second cross-sectional dimension of approximately 15 mm when expanded.

Figure 8:
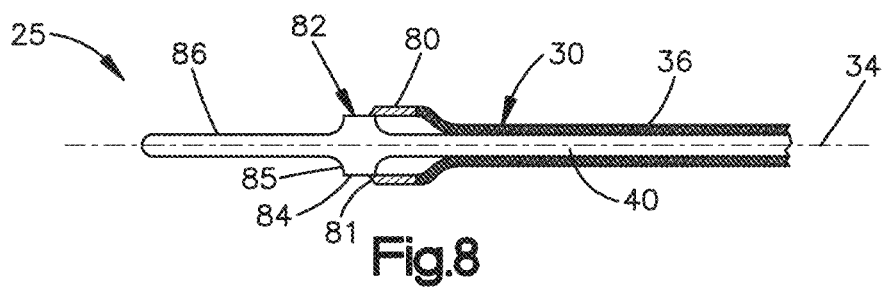
FIG. 8 is a side elevation view of one embodiment of a surgical access system including a surgical access port having a rigid region, and a vertebral distractor.

Referring now to FIG. 8A, the flexible surgical access port 30 can be configured to be anchored to the superior and inferior vertebrae 27 and 22, respectively, such that the working channel 55 defines a path to the intervertebral space 14. In one example, the flexible access port 30 can further include a rigid region 80 that extends distally from the distal end 38b of the flexible body 36. Thus, the distal end of the flexible surgical access port 30 can be defined by the rigid region 80. The lumen 40 of the surgical access portion 30 can thus also extend through the rigid region 80. The rigid region 80 can be configured to maintain its height along the transverse direction T in response to anatomical compressive forces. The rigid region 80 can also be radially unexpandable, and can define the maximum cross-sectional dimension of the flexible access port 30 that can accommodate a surgical equipment that is to be inserted through the flexible access port 30.

The surgical access system 25 can further include a vertebral distraction tool 82 that is configured to distract the vertebrae 22 and 27 so as to increase the height of the disc space 14. In one example, the vertebral distraction tool 82 can include a shaft 84 and a distraction member 86 at a distal end of the shaft 84. As illustrated in FIGS. 8A-9B, the distraction member 86 can have a first height H1 along the transverse direction T when the distraction member 86 is in a first position, and a second height H2 along the transverse direction T that is greater than the first height when the distraction member 86 is in a second position. The second position can be rotated along the central axis of the shaft 84 with respect to the first position. For instance, the second position can be rotated 90 degrees with respect to the first position.

Figure 9A:
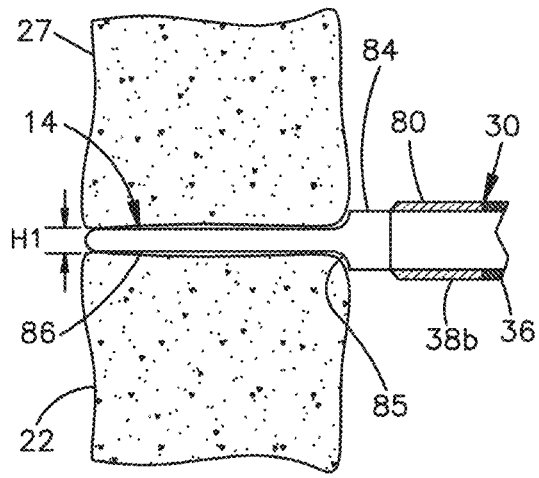
FIG. 9A is a side elevation view of the surgical access system of FIG. 8, showing the vertebral distractor inserted into an intervertebral space in a first position.

Thus, referring also to FIG. 9A, during operation the vertebral distraction tool 82 can be inserted distally into the lumen 40 of the flexible surgical access port 30 while the distraction member 86 defines the leading end of the vertebral distraction tool 82 with respect to travel in the lumen 40. The shaft 84 can be sized to cause the flexible body 36 to expand, or can be sized substantially equal to the dimension of the flexible body 36 when the flexible body 36 is unexpanded. The vertebral distraction member 82 can define the first position, such that the distraction member 86 defines the first height. The first height H1 can be sized for insertion into the intervertebral space such that opposed upper and lower surfaces face the respective superior and inferior vertebrae. The distraction member 86 can have any suitable length along the central axis of the shaft 84 so as to support the near and far vertebral cortex of each of the vertebrae 22 and 27. In one example, the length of the distraction member can be between 20 mm and 50 mm, such as between 25 mm and 40 mm. The vertebral distraction tool 82 can define a stop surface 85 that is configured to abut either or both of the vertebrae 22 and 27 when the distraction member 86 is fully inserted in the intervertebral space 14, such that the distraction member 86 can support the near and far cortex of each of the vertebrae 22 and 27. The shoulder 85 can be defined by an interface between the distraction member 86 and the shaft 84. During operation, the distraction member 86 is inserted into the intervertebral space 14 until the stop surface 85 abuts one or both of the vertebrae 22 and 24.

Figure 9B:
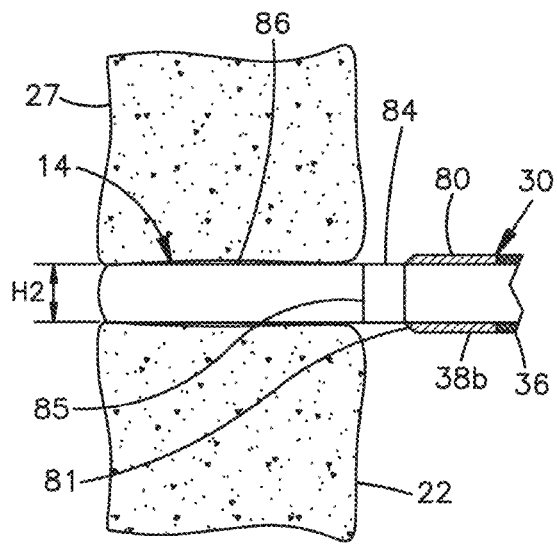
FIG. 9B is a side elevation view of the surgical access system of FIG. 9A, showing the vertebral distractor inserted into an intervertebral space and in a second distraction position whereby the vertebrae that define the intervertebral space are distracted.

Next, referring also to FIG. 9B, the distraction member 86 can be moved to the second position. In particular, the distraction member 86 can be rotated about the central axis of the shaft 84 so that the distraction member 86 defines the second height. The distraction member 86 can be moved by rotating the shaft 84 about its axis, which causes the distraction member 86 to similarly rotated. Because the second height H2 of the distraction member 86 is greater than the first height H1, the distraction member 86 distracts the vertebrae 22 and 27, thereby increasing the height of the disc space 14 along the transverse direction T, when the distraction member 86 is moved to the second position. It is recognized that the distraction tool 82 can distract the vertebrae in accordance with any suitable alternative embodiment as desired.

Figure 9C:
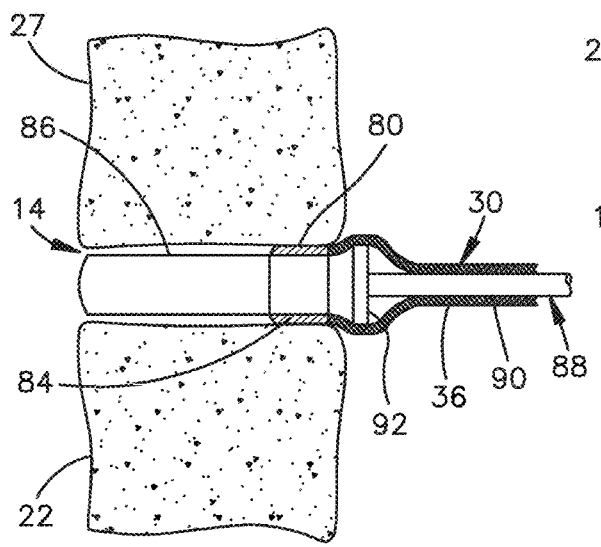
FIG. 9C is a side elevation view of the of the surgical access system of FIG. 9B, showing a pusher tool engaging the rigid region and urging the rigid region into the distracted intervertebral disc space.

Referring now also to FIG. 9C, the surgical access system 25 can include a pusher tool 88 that is configured to urge the rigid region 80 into the intervertebral space 14. The pusher tool 88 can include a pusher shaft 90 and a pusher member 92 that extends distally from the pusher shaft 90. The pusher tool 88 can be cannulated so as to receive the shaft 84 of the distraction tool 82. The pusher tool 88 can define a cross-sectional dimension that is sufficient so as to abut the rigid region 80. Thus, the pusher tool 88 can be driven distally in the lumen 40 to position whereby the pusher member 92 abuts a proximal face of the rigid region 80. As described above, the flexible body can expand locally to accommodate the pusher member 92 as it travels in the lumen toward the rigid region 80. The rigid region 80 can have a length less than the distance from the Kambin's triangle to the vertebrae 22 and 27. Thus, when the rigid region 80 is disposed adjacent the vertebral bodies 22 and 27, the rigid region 80 does not compress the nerves of Kambin's triangle. In one example, the rigid region 80 can have a length that is between 5 mm and 15 mm in some examples.

The height of the rigid region 80 can be greater than the height of the disc space 14 prior to distraction of the vertebral bodies 22 and 27 that expands the disc space 14 along the transverse direction T. The rigid region 80 can have a height along the transverse direction T that is sufficient to maintain the vertebral bodies 22 and 27 in their respective distracted positions. During operation, the pusher tool 88 can be advanced distally in the lumen 40 until the pusher member 92 abuts the rigid region 80. The pusher tool 88 can locally expand the flexible body 36 as it travels in the lumen. When the pusher member 92 abuts the rigid region 80, further distal advancement of the pusher member 92 causes the pusher member 92 to urge the rigid region 80 to travel distally into the disc space 14. The rigid region 80 can have a distal end 81 that is substantially wedge shaped to fit between the distraction member 86 and the vertebrae 22 and 27. The rigid region 80 can therefore further distract the vertebrae 22 and 27 slightly. The rigid region 80 can be advanced distally until it supports the near cortex of the inferior vertebra 22 and the superior vertebra 27, respectively.

Figure 9D:
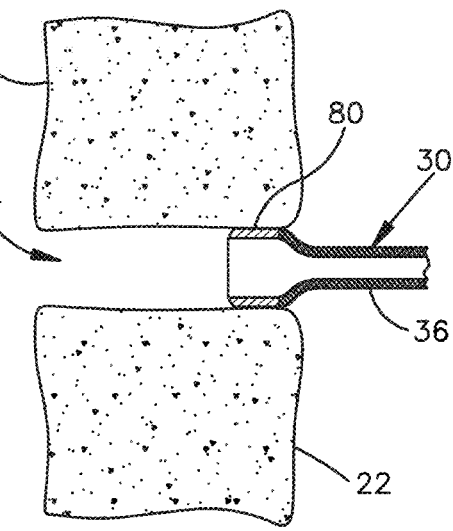
FIG. 9D is an illustration of the surgical access system of FIG. 9C, showing the distractor removed from the intervertebral space, and the rigid region disposed in the intervertebral space while the vertebrae are distracted.

Referring now also to FIG. 9D, once the rigid region 80 is disposed in the intervertebral space, the pusher member 92 can be removed from the surgical access port 30 by translating the pusher member 92 proximally out of the lumen 40. The vertebral distraction tool 82 can also be removed from the surgical access port 30 by translating the pusher member 92 proximally out of the lumen 40. In one example, the distraction tool 82 can abut the pusher member 92, such that removal of the distraction tool 82 also removes the pusher member 92. The rigid region 80 can have a length that large enough to maintain the vertebrae 22 and 27 in their distracted position, but short enough to allow a substantial entirety of the disc material to be removed from the intervertebral space 14. In particular, disc removal instruments can be subsequently driven distally through the surgical access port 30 and into the intervertebral space 14 to remove disc material in preparation for insertion of an intervertebral implant. Once the implant is disposed in the intervertebral space 14, the intervertebral implant can be expanded so that it abuts the inferior vertebra 22 and the superior vertebra 27. The implant can further distract the vertebrae 22 and 27 if desired. Once the surgical procedure has been completed, the rigid region 80 can be removed from the disc space 14, and the surgical access port 30 can be removed from the patient.

Figure 10A:
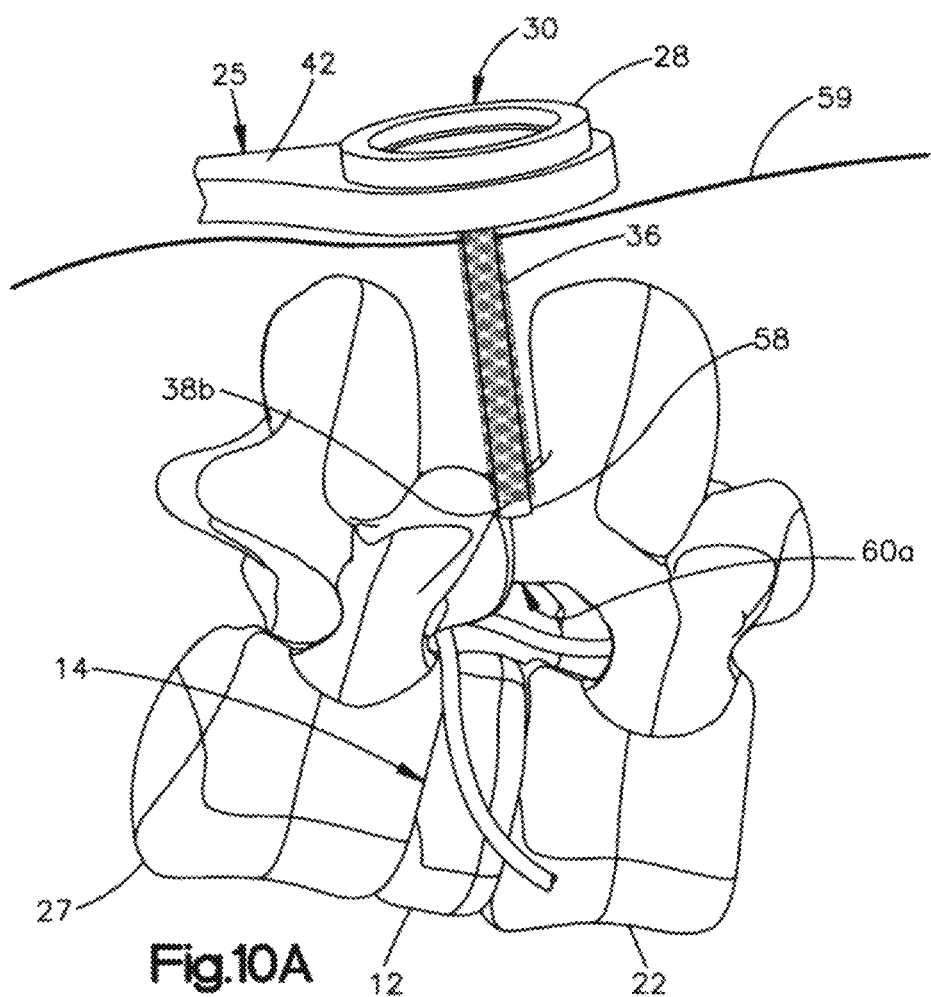
FIG. 10A is a perspective view of the flexible surgical access port of FIG. 3 and an access port received in the flexible surgical access port.

One example of a surgical procedure using the flexible surgical access port 30 will now be described with reference generally to FIGS. 10A-12B. It should be appreciated that this is only one example of a surgical procedure, and that the flexible surgical access port 30 can be incorporated into any suitable alternative surgical procedure as desired. As shown in FIG. 10A, an incision is made in the patient's skin 59, and any suitable guide member 58 can be driven through the lumen 40 of the flexible body 36 in the manner described above, such that a distal end of the guide member 58 extends distal of the distal end 38b of the flexible body 36. The guide member 58 can be configured as the stylet 48 described above (see FIG. 5A), a trocar, or any suitable alternative guide member 58 as desired. The guide member 58 can be driven through the incision toward a target surgical location, which can be referred to as a first target surgical location 60a. The first target surgical location 60a can be configured as a vertebra, such as the inferior vertebra 22. The guide member 58 can be do0cked into one of the vertebrae to create a trajectory to a target surgical location which can be configured as a first target surgical location 60a.

The position of the guide member 58 can be monitored under any suitable imaging system as it is driven to the first target surgical location to ensure that the guide member 58 is driven to the desired location. In one example, the distal end of the guide member 58 can carry a camera that outputs real-time images or video to the operator as the guide member 58 is driven toward the first target surgical location 60a. The first target surgical location 60a can be defined by the superior articular process of the inferior vertebra 22. Because the flexible body 36 travels along with the guide member 58, the guide member 58 positions the lumen 40 to define a trajectory to the first target surgical location 60a. The guide member 58 then be removed from the flexible body 36.

Figure 10D:
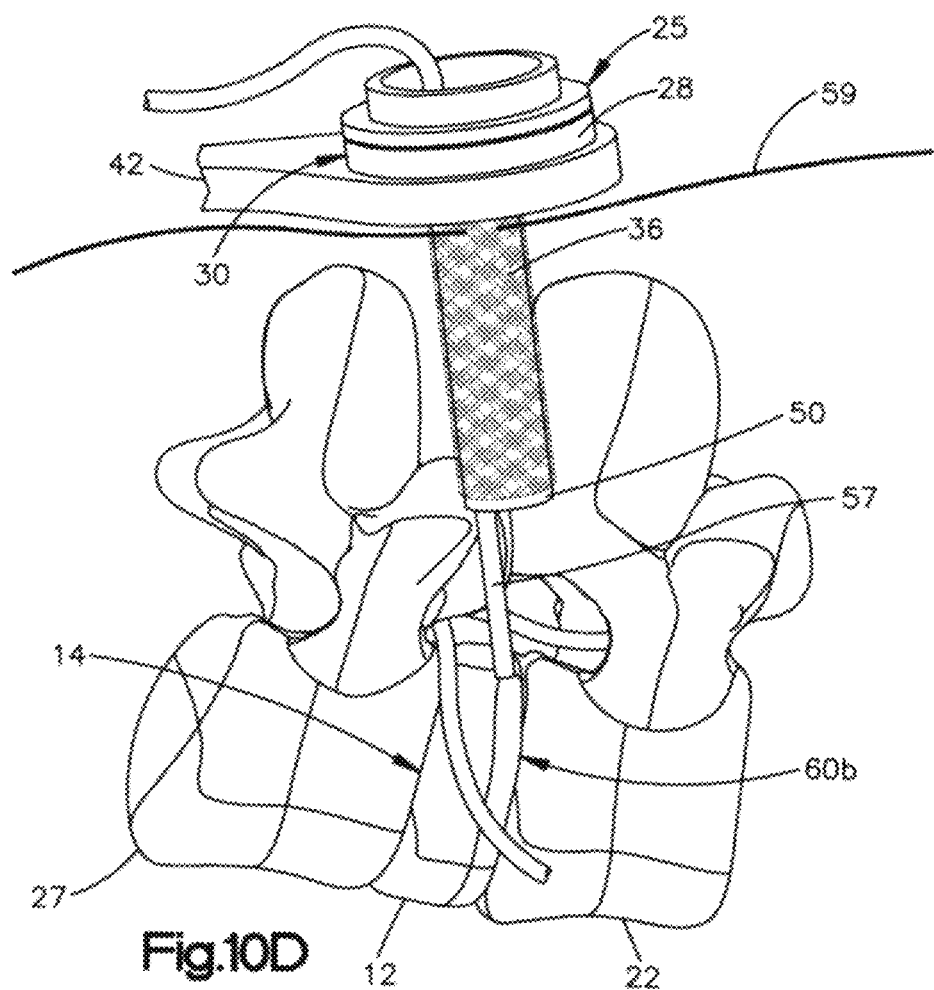
FIG. 10D is another illustration of the cannula of FIG. 10C fully seated in the flexible surgical access port.

Referring now to FIGS. 10B-10D, the access cannula 50 can be driven distally through the lumen 40 such that the working channel 55 establishes a trajectory to the first target surgical location 60a. The working channel 55 can have any suitable cross-sectional dimension as desired, such as approximately 13 mm, though it should be appreciated that the working channel can be sized as desired. The access cannula 50 can define an outer diameter of approximately 15 mm, though it should be appreciated that the access cannula 50 can be sized as desired. The cross-sectional dimensions of the working channel 55 and access cannula 50 can define respective diameters, though the working channel 55 and access cannula 50 can define any suitable respective shapes as desired. As described above, insertion of the access cannula 50 into the lumen 40 causes the flexible body 36 to expand from the first configuration to the second configuration. The position of the access cannula 50 can be monitored under any suitable imaging system as it is driven to the first target surgical location to ensure that the access cannula 50 is driven to the desired location. In one example, the distal end of the access cannula 50 can carry a camera that outputs real-time images or video to the operator as the guide member 58 is driven toward the first target surgical location 60a.

Any one or more surgical procedures can then be performed through the working channel 55 as desired. Any suitably sized surgical equipment, such as a cutting instrument, can be driven through the working channel 55 to perform a foraminoplasty, whereby bone is removed from the superior articular process of the inferior vertebra. The foraminoplasty can enlarge the Kambin's triangle. An annulotomy can also be performed on the intervertebral disc 12 through the working channel 55, followed by removal of the disc material to achieve decompression of the intervertebral disc space. If desired, the access cannula 50 can be angulated to further direct the working channel 55 toward the intervertebral disc space 14 while the access cannula 50 is disposed in the lumen 40. Once the surgical procedures have been completed through the working channel 55 and the surgical equipment has been removed, the access cannula 50 can be removed from the lumen 40 of the flexible body 36. The flexible body 36 then returns toward or to the first configuration in the manner described above.

Figure 10E:
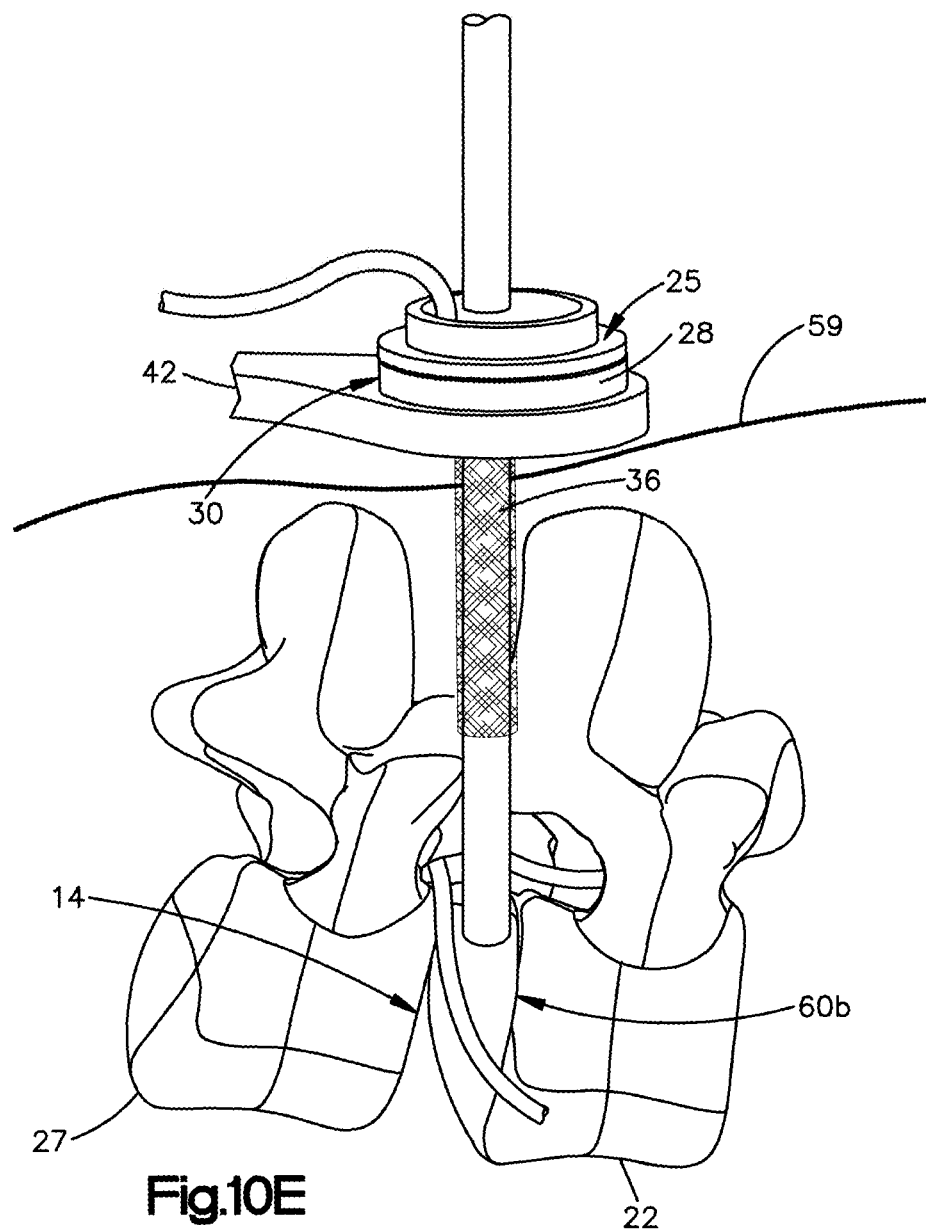
FIG. 10E is a perspective view of a guide member inserted through the flexible surgical access port along a trajectory that extends through an intervertebral disc space.

Next, referring to FIG. 10E, once the access cannula 50 has been removed, the surgical access system 25 can be repositioned and oriented to provide access to a second target surgical location 60b. For instance, the flexible surgical access port 30 can include a Bowden cable that can be coupled to the flexible body 36 so as to change an orientation of the flexible body 36. The second target surgical location 60b can be defined by the intervertebral disc space 14. Thus, the flexible body 36 can extend through Kambin's triangle 24, such that the lumen 40 defines an access path to perform one or more surgical procedures on the intervertebral disc space 14. In particular, any suitable guide member 58 can be driven through the lumen 40 of the flexible body 36 in the manner described above, such that a distal end of the guide member 58 extends distal of the distal end 38b of the flexible body 36. The guide member 58 can be configured as the stylet 48 described above, a trocar, or any suitable alternative guide member 58 as desired. The guide member 58 can be driven through Kambin's triangle 24 to the intervertebral disc space 14. It is envisioned that the guide member 58 does not cause compression of the surrounding nerves of Kambin's triangle 24.

Figure 11A:
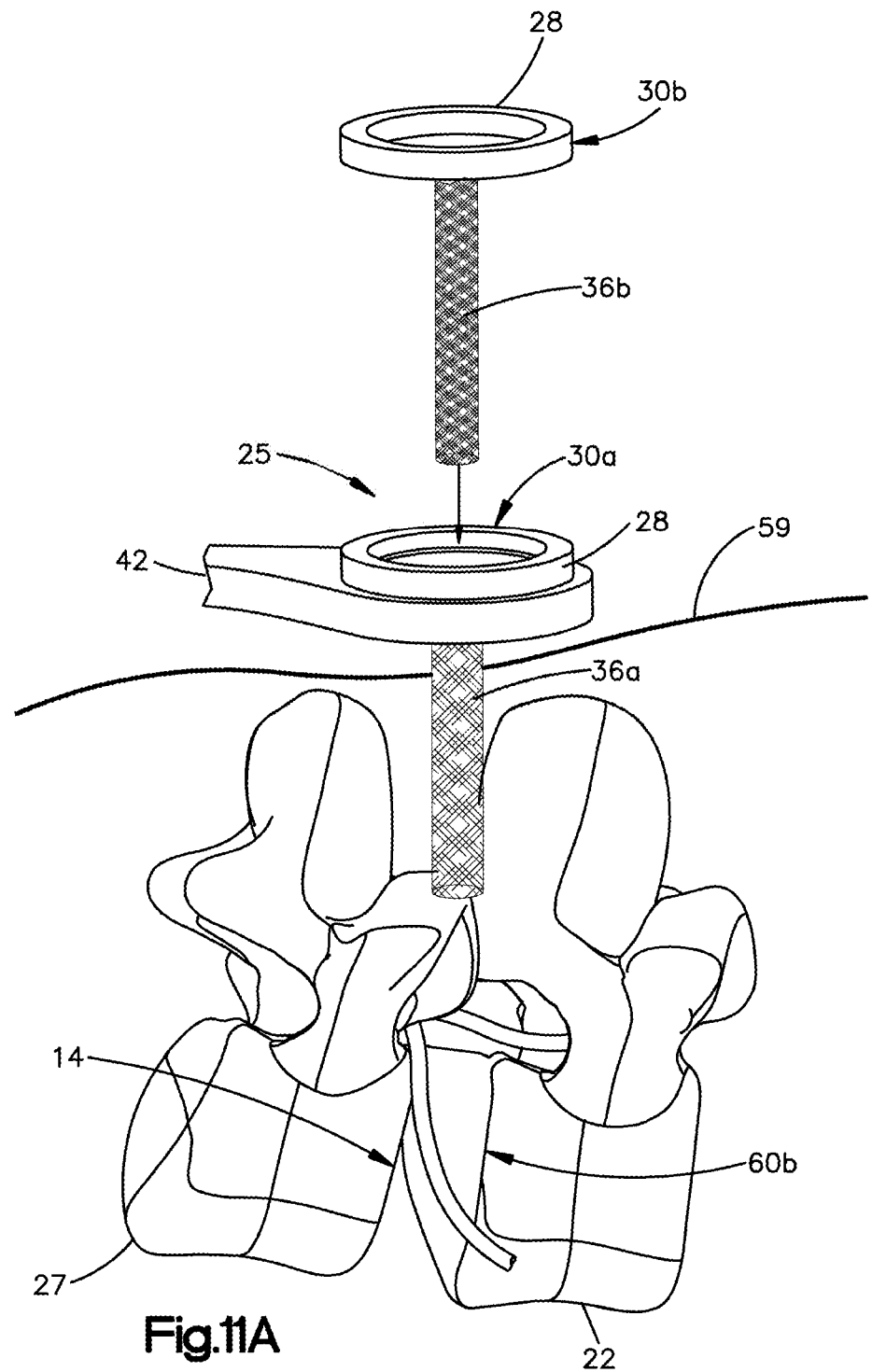
FIG. 11A is a perspective view showing the flexible distal access port inserted through the flexible surgical access port of FIG. 10E.
Figure 11B:
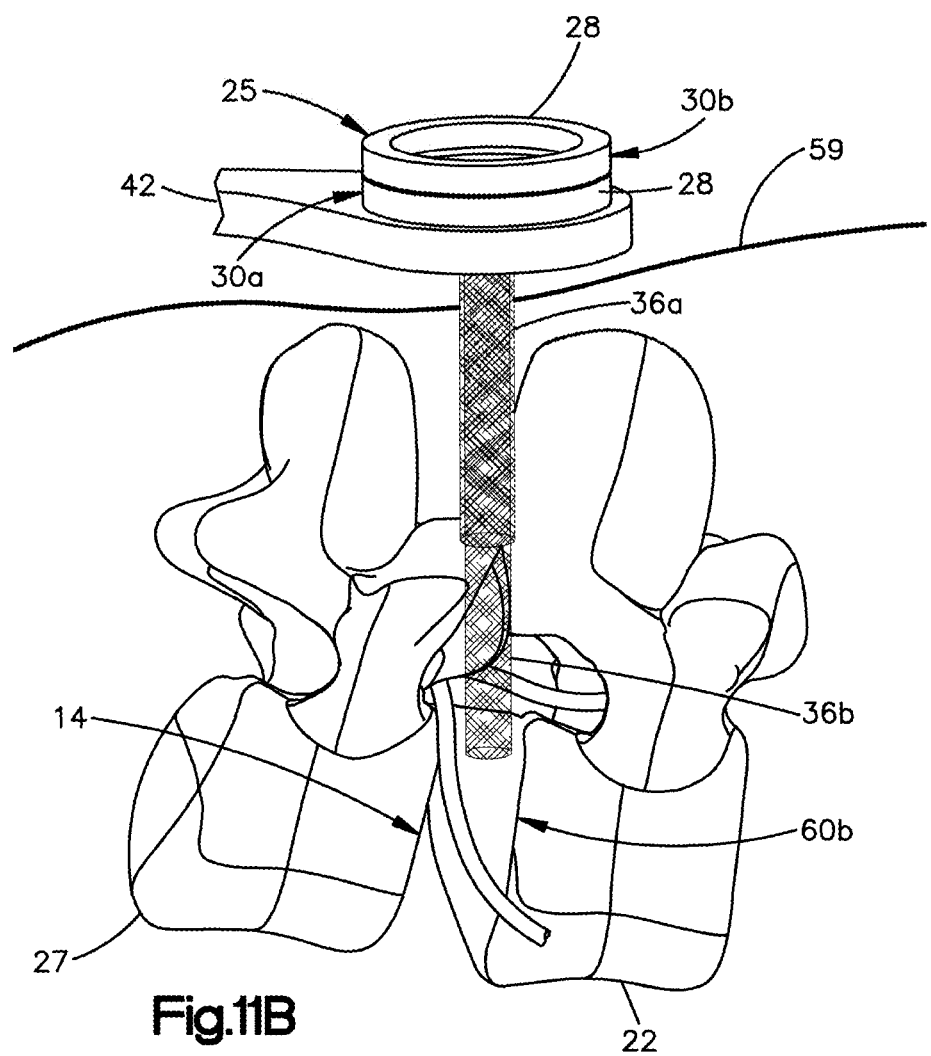
FIG. 11B is a perspective view showing the distal flexible surgical access port fully inserted through the flexible distal access port of FIG. 11B.

As described above with respect to FIGS. 10B-10D, the flexible body 36 has a length suitable to extend toward or to the superior articular process of the inferior vertebra 22. As illustrated in FIG. 10D, the surgical equipment 46 can include a debridement instrument 57 that can be configured to remove disc 12 from the intervertebral disc space 14. Next, as shown in FIG. 11A, when the access port 30 is repositioned to extend toward the intervertebral disc space 14 to perform a transforaminal lumbar interbody fusion (TLIF) procedure, the length of the flexible body 36 is insufficient to extend through Kambin's triangle 24. Accordingly, a second access port 30b, and in particular a second flexible body 36b of the second access port 30b, can be driven through the lumen 40 of the previously introduced flexible body 36 of the previously introduced access port 30. The previously introduced flexible body 36 can be referred to as a first or proximal flexible body 36a, and the previously introduced access port 30 can be referred to as a first or proximal flexible surgical access port 30a. The second flexible body 36b and the second access port 30b can be referred to as a distal flexible body and a distal access port, respectively. The second access port 30b can be constructed as described above with respect to the flexible surgical access port 30, but can have a length longer than that of the first flexible surgical access port 30a. In particular, as shown in FIG. 11B, the length of the second access port 30b can be sufficient to extend through Kambin's triangle 24.

Figure 13A:
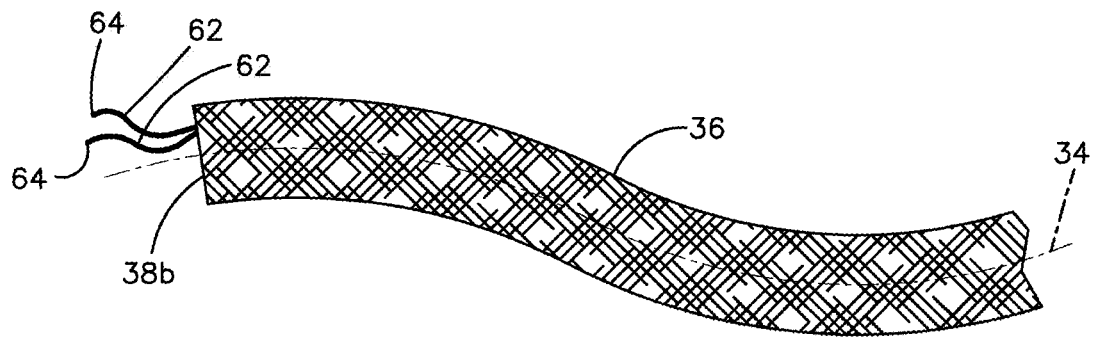
FIG. 13A is a perspective view of a portion of a flexible surgical access port, including vertebral anchoring member in one example.
Figure 13B:
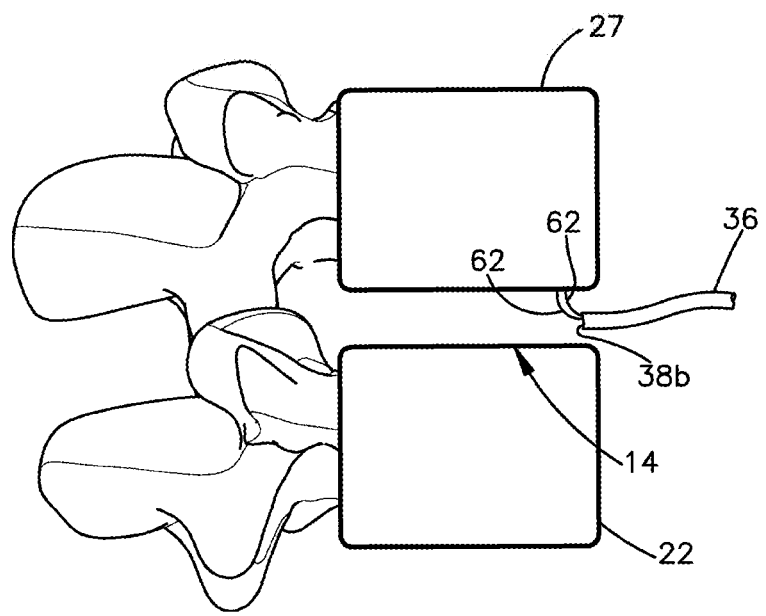
FIG. 13B is a side elevation view of the portion of the flexible surgical access port of FIG. 13A, shown anchored to vertebrae.
Figure 16:
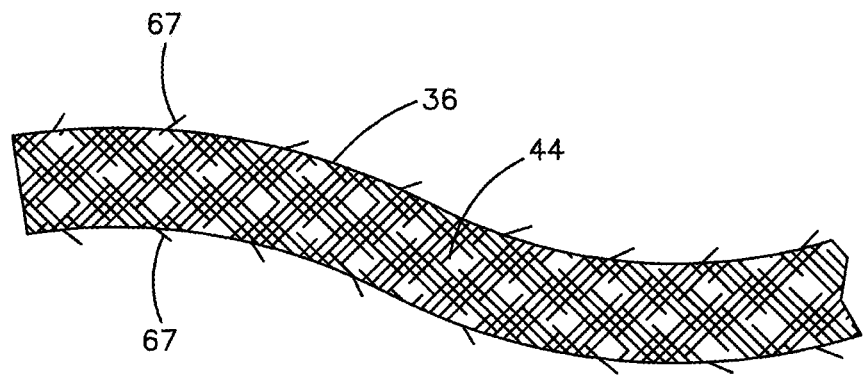
FIG. 16 is a side elevation view of an access port including friction increasing filaments in another example.

Further, as illustrated in FIGS. 13A-13B, the second access port 30b can include the anchor structure 62 that anchors the second access port 30b to anatomical tissue at or proximal to the intervertebral disc space 14. For instance, the anchor structure 62 can purchase with surrounding soft tissue or either or both of the vertebrae 13 of the inferior vertebra 22 and the superior vertebra 27. In one example, the anchor structure 62 can include one or more anchor wires 64 that project radially out from the flexible body 36, for instance from the distal end 38b of the flexible body 36. In one example, it is envisioned that the anchor structure can be confined to a first side of the central axis 34, such that the majority of expansion of the flexible body 36 can be defined at a second side of the central axis 34 opposite the first side. Thus, expansion of the flexible body 36 can be confined to a direction that extends away from the exiting nerve and the traversing nerve root of Kambin's triangle as surgical equipment passes through the lumen 40. In one example, the anchor wires 64 can be made from nitinol, such that movement of the anchor wires 64 in the distal direction causes the wires 64 to extend radially outward and anchor into the surrounding tissue, such as the annulus or disc material. As shown in FIG. 16, it is further envisioned that the access port 30 can include biocompatible filaments 67 or other texture at its radially outer surface that increases friction with the surrounding anatomical tissue, thereby resisting unintended movement of the flexible surgical access port 30. The filaments 67 can be interwoven with the fibers 44 or otherwise carried by the fibers 44 as desired.

Figure 12A:
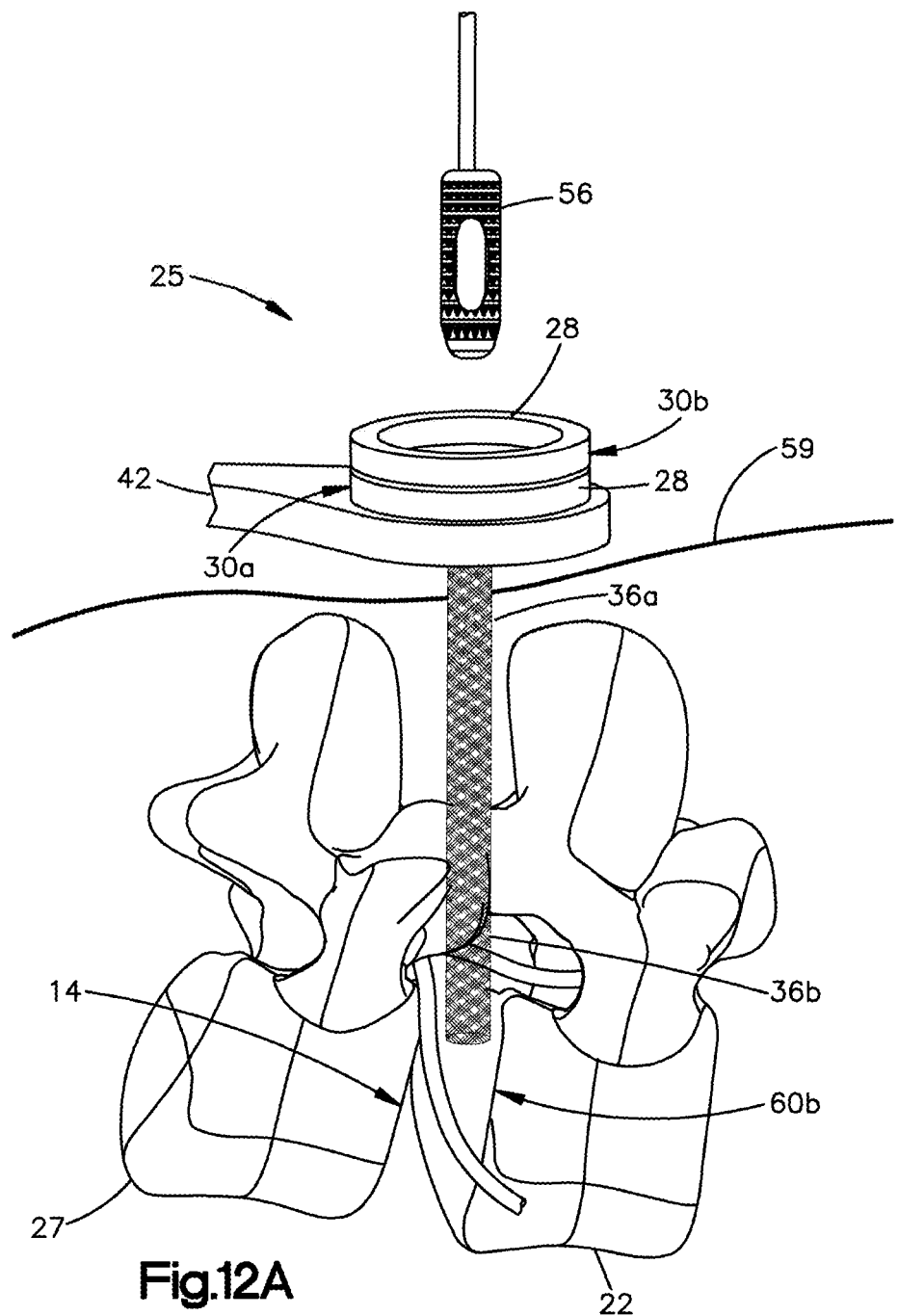
FIG. 12A is a perspective view of one embodiment of a spinal fusion cage aligned for insertion through the flexible distal access port of FIG. 11C and into the intervertebral space.
Figure 12B:
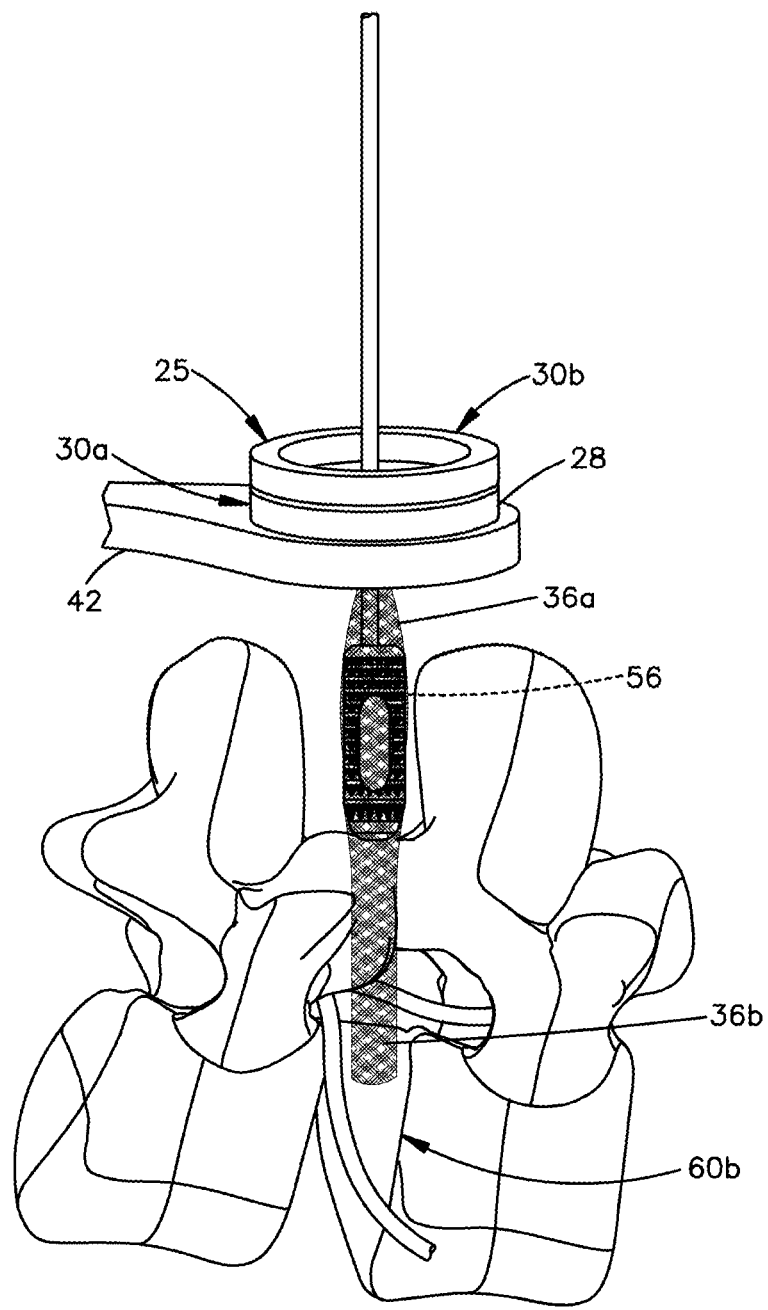
FIG. 12B is a perspective view of the spinal fusion cage of FIG. 12A being inserted through the flexible surgical access port of FIG. 12A into the intervertebral space.

Referring now to FIGS. 12A-12B, an intervertebral implant 56 can be implanted into the intervertebral disc space 14. In particular, the intervertebral implant 56 can be driven distally through the lumen 40 of the second flexible body 36b. The intervertebral implant 56 can define a cross-sectional dimension greater than that of each of the first flexible body 36a and the second flexible body 36b. Thus, the flexible bodies 36a-b expand radially as the implant is driven through the lumen 40. The surgical access system 25 can be provided without a nerve shield because any compression of the exiting nerve and the traversing nerve root of Kambin's triangle due to the enlarged size of the intervertebral implant 56 is momentary as the intervertebral implant 56 is driven distally into the disc space. The intervertebral implant 56 can be an expandable vertebral implant constructed in accordance with any suitable embodiment. Thus, once the intervertebral implant 56 has been inserted into the intervertebral disc space, the implant 56 can be expanded to increase its height, thereby achieving height restoration of the intervertebral disc space. In particular, an expansion tool such as a driving instrument that has been driven distally though the lumen 40 can engage an expansion member of the implant 56, and actuated so as to cause vertical expansion of the intervertebral implant 56. One example of an expandable intervertebral implant 56 is described in U.S. Pat. No. 8,105,382, the disclosure of which is hereby incorporated by reference as if set forth in its entirety herein.

Figure 17:
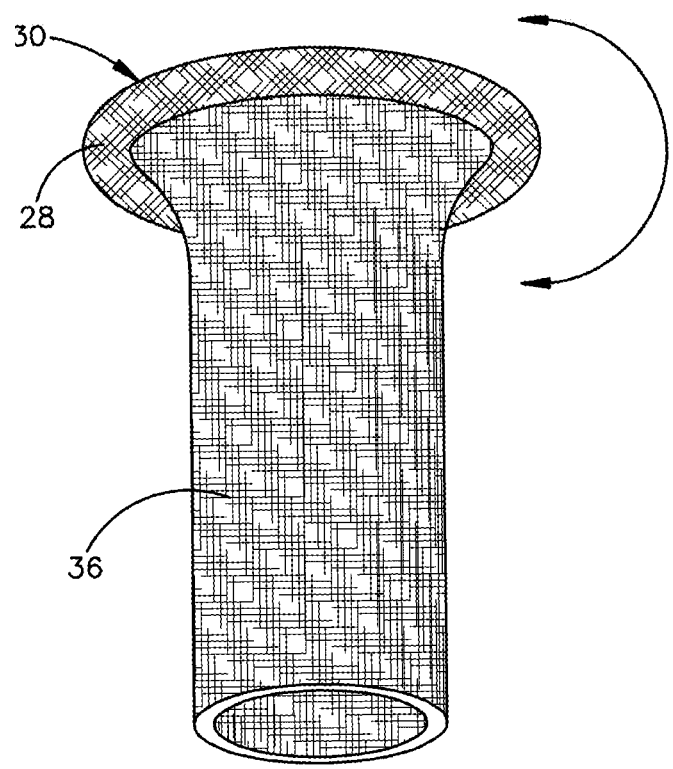
FIG. 17 is a perspective view of an access port whereby a flexible body can be rolled onto a collar to adjust the length.

It should be appreciated that while the surgical access system 25 can include the second flexible surgical access port 30*b* that is inserted into the first flexible surgical access port 30*a*, other options are contemplated. For instance, the first flexible surgical access port 30*a* can be removed, and the second flexible surgical access port 30*b* can be inserted through Kambin's triangle toward the disc space in the manner described above. In another example, the length of the flexible body portion 36 of the flexible surgical access port 30 can be adjustable. For instance, as shown at FIG. 17, the proximal end of the flexible body portion 36 can be rolled over itself and unrolled around the collar 28 at a location above the skin to shorten the length of the flexible body portion 36 along the central axis. For instance, the collar 28 can be rotated in a first direction about its circumferential axis to roll the proximal end of the flexible body portion 36 over itself, thereby decreasing the length of the flexible body portion 36 and thus decreasing the length of the flexible surgical access port along the central axis of the flexible body portion 36. The collar 28 can be rotated in a second direction opposite the first direction about its circumferential axis to unroll the flexible body portion 36, thereby increasing the length of the flexible body portion 36 along the central axis of the flexible body portion 36. Thus, in one example, the flexible body portion 36 can define the desired length to provide access to the inferior vertebra when it is desired to perform the foraminoplasty. The flexible body portion 36 can be subsequently lengthened such that the flexible body portion 36 is sized to extend through Kambin's triangle toward or to the intervertebral disc space.

Figure 10G:
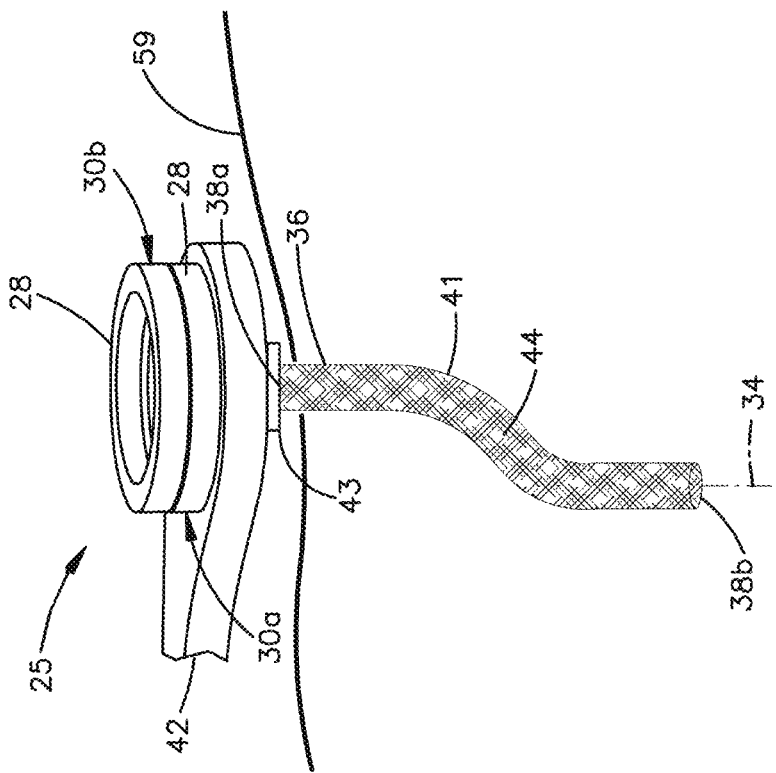
FIG. 10G is a perspective view of the spinal fusion cage of FIG. 10F, but showing the tethering mechanism configured to change the trajectory of the surgical access port.
Figure 10F:
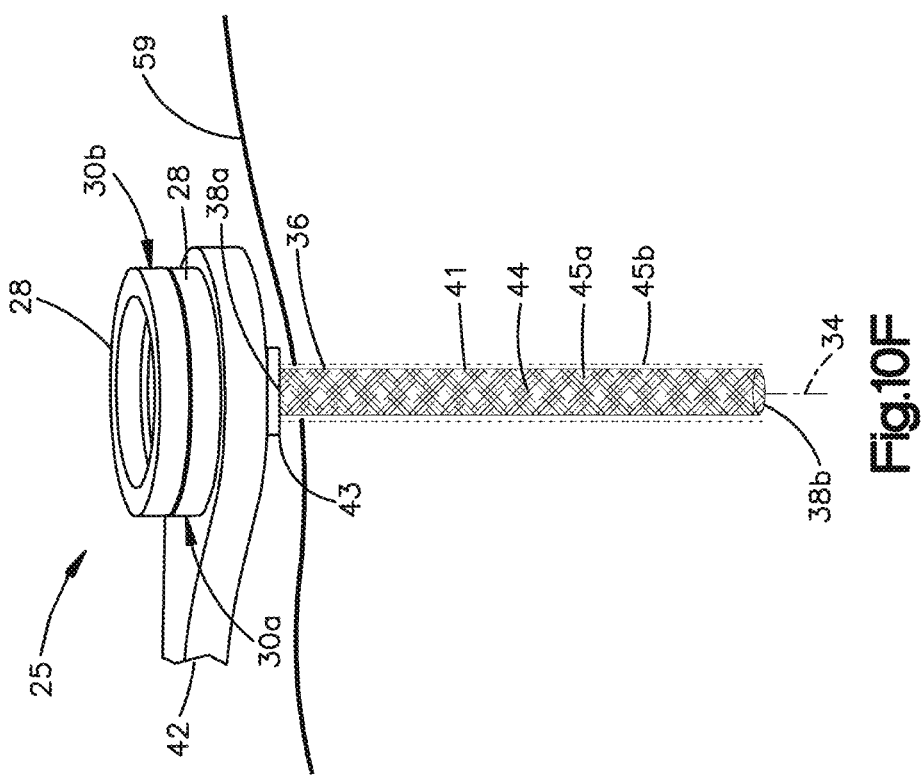
FIG. 10F is a perspective view of the flexible surgical access port of FIG. 10A, but including a tethering mechanism configured to expand the flexible surgical access port.

In other examples as shown at FIGS. 10F-10G, it is envisioned that the cross-sectional dimension of the flexible body 36 can be adjustable prior to introducing surgical equipment into the lumen 40. For instance, a tethering mechanism such as a spring member or a Nitinol wire with shape memory can be interwoven with the fibers 44, and can be actuated by an actuator 43 to increase or decrease the cross-sectional dimension as desired. It is envisioned that the actuator can be located above the skin. In one example, the actuator 43 can be defined by the collar 28 or otherwise supported by the collar 28 that can be rotated or otherwise actuated. In an example whereby the tethering mechanism is defined by one or more Nitinol or other electrically conductive wires configured to produce a change in shape of the flexible body, the actuator can change the temperature of the wire to cause the flexible body 36 to move selectively between a first position 45*a* whereby the flexible body 36 defines a first cross-sectional dimension, and a second position 45*b* whereby the flexible body 36 expands to a second cross-sectional dimension greater than the first cross-sectional dimension. Thus, the actuator 43 can cause the wire to move in a first direction from the first position 45*a* to the second position 45*b*, and in and a second direction from the second position 45*b* to the first position 45*a*. The first and second cross-sectional dimension can be measured along a direction substantially perpendicular to the central axis 34. In other example, the actuator 43 can be configured to deliver an electrical current to the wire that has a resistance, such that the electrical current causes the wire 41 to move selectively in the first and second directions, respectively. As shown at FIG. 10G, actuator 43 can urge the wire in the manner described above so as to cause the trajectory of the flexible body 36 to change from the proximal end 38*a* to the distal end 38*b*. Thus, the central axis 34 of the flexible body 36 can be non-linear. In this regard, the distal end 38*b* can be moved from a first position proximate to the first target surgical location 60*a* (see FIG. 10C) to a second position proximate to the second target surgical location 60*b* (see FIG. 10E).

Figure 14A:
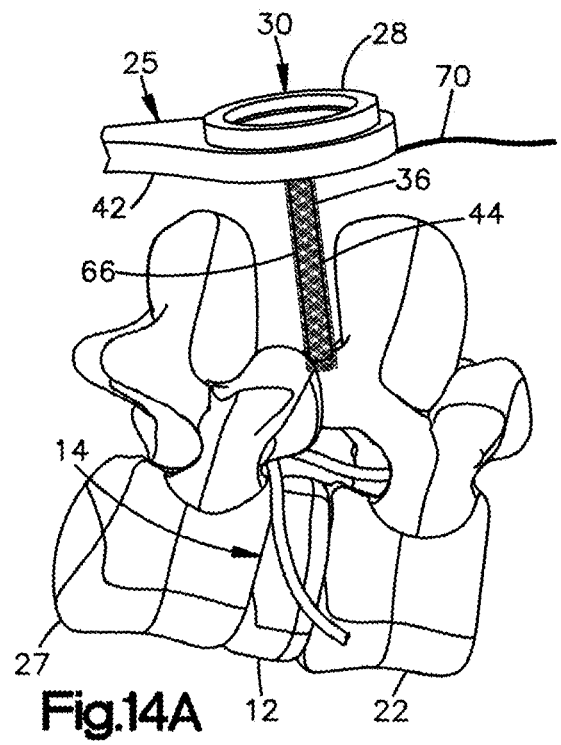
FIG. 14A is a perspective view of a flexible surgical access port including at least one neuromonitoring wire in one example.
Figure 14B:
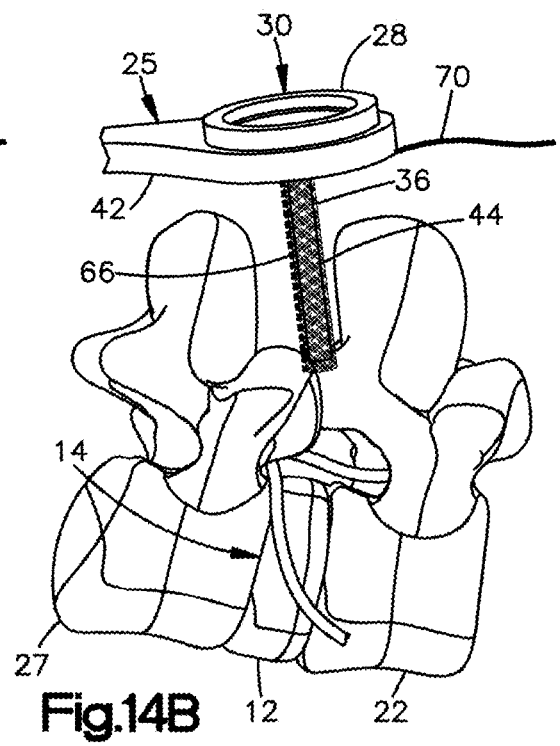
FIG. 14B is a perspective view of a flexible surgical access port including at least one neuromonitoring wire in another example.

Referring now to FIGS. 14A-14B, the flexible surgical access port 30 can be configured to provide neuromonitoring as the flexible surgical access port 30 is driven toward a target surgical access location. In particular, the fibers 44 of the flexible body 36 can include one or more electrically conductive or metallic wires that are configured to carry electrical current as illustrated in FIG. 14A. Alternatively, as illustrated in FIG. 14B, one or more electrically conductive or metallic wires 66 can extend along the flexible body 36. For instance, the metallic wires 66 can be woven through or otherwise carried by the flexible body 36. A neuro-monitoring lead 70 can be attached to the proximal end of the access port 30 and in electrical communication with the electrically conductive wires 66. The electrically conductive wires 66 can be surrounded by a dielectric coating along its length to provide electrical insulation. The distal ends of the wires can remain exposed and uncovered by the dielectric coating. The wires can be made from any suitable electrically conductive material such as silver, copper, gold, aluminum, platinum, stainless steel and the like. The dielectric coating can be made from any suitable electrically insulative material such as parylene.

During operation, a constant electrical current may be applied to the wires. Accordingly, when the distal end 38*b* of the flexible body 36 approaches a nerve, the nerve may be stimulated. The degree of stimulation to the nerve is related to the distance between the distal tip 1111 and the nerve. Stimulation of the nerve may be measured by, e.g., visually observing the patient's leg for movement, or by measuring muscle activity through electromyography (EMG) or various other known techniques.

Utilizing this configuration may provide the operator with added guidance as to the positioning of the first dilator tube to the surgical access point and through Kambin's triangle. With each movement, the operator may be alerted when the tip of the flexible surgical access port 30 approaches or comes into contact with a nerve. The operator may use this technique alone or in conjunction with other positioning assistance techniques such as fluoroscopy and tactile feedback. The amount of electrical current applied to the fiber or wire may be varied depending on the preferred sensitivity. The greater the current supplied, the greater nerve stimulation will result at a given distance from the nerve. In various embodiments the current applied to the conductive wire may not be constant in some examples, but rather periodic or irregular. Alternatively, pulses of current may be provided only on demand from the operator. In one example, the neuromonitoring can be performed by Sentio MMG technology to monitor nerve location and nerve health during the procedure.

Figure 15:
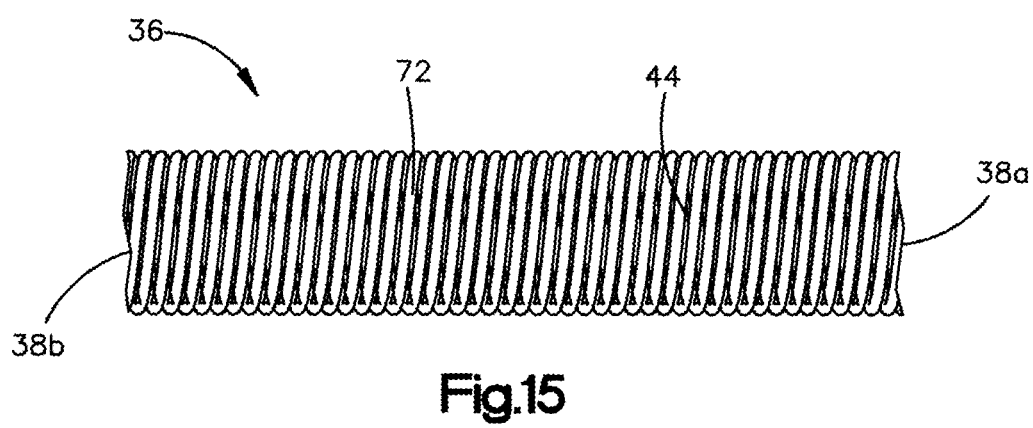
FIG. 15 is a perspective view of a portion of a flexible surgical access port that includes one or more conduits for fluid delivery or application of suction.

Referring now to FIG. 15, the flexible surgical access port 30 can have one or more additional features that assist the surgical procedure. For instance, one or more of the fibers 44 can be configured as a respective tubes 72 having internal lumens configured to deliver fluid such as saline under positive pressure or remove fluid such as anatomical fluid under negative pressure. The fibers 44 can have distal ends that deliver fluid or receive the fluid. The distal ends of the tubes 72 can be recessed with respect to the distal end 38*b* of the flexible body 36 to prevent negative pressure from urging soft tissue into the distal ends of the tubes 72 when the tubes 72 are configured to remove fluid under negative pressure.

In another example, the flexible surgical access port 30 can include one or more fiber optics configured to transmit light and/or video. In one example, one or more fiber optic cables can extend along the flexible body 36 or can be woven through or otherwise carried by the flexible body 36 as shown in FIG. 14B with respect to the metallic wires 66. The fiber optic cables can receive light from a light source at their respective proximal ends, and can deliver light at their respective distal ends to provide illumination of the respective target surgical location or anatomical tissue during navigation toward or to the target surgical location. In another application, the fiber optic cables can transmit images that are processed to create a camera image of the anatomical tissue distal of the flexible surgical access port 30 visible by the operator.

In still another example, the flexible body 36 can include at least one sensor to assess nerve health/retraction/duration. For instance, the at least one sensor can include a load sensor that measures pressure on the wall of the access port 36, and therefore the load that the access port 36 is exerting on the soft tissue surrounding the access port 36. The measured load can be compared to a threshold load limit, for instance during expansion of the access port 36. If the measured load is greater than the threshold load, it can be determined that the access port 36 is being expanded at a rate that is too rapid and is thus exerting higher loads than desired on the soft tissue. The rate of expansion of the access port 36 can thus be reduced until the measured load is within the threshold load limit. The at least one sensor can also include a near Infrared (NIR) or visual wavelength sensor to allow for analysis of any ischemic effects on the color or appearance of soft tissue, and thus to assess the soft tissue health or tissue identity. The at least one sensor can further include one or more electrically conductive wires that can be sewn or woven into the fibers of the flexible body 36 or can be otherwise supported by the flexible body 36, and can extend along a portion up to an entirety of the length of the flexible body 36. The wires can be coupled to one or more sensors that are configured to measure humidity, impedance, capacitance, resistance, and the like, and can also monitor activity and health of the nerves of Kambin's triangle. The electrically conductive wires can further be coupled to one or more strain gauges that measure the strain of the fibers of the flexible body 36 as the flexible body 36 expands. A correlation can be applied between the measured strain of the fibers and the pressure applied by the flexible body 36 to the surrounding tissue.

It should be noted that any ordering of method steps expressed or implied in the description above or in the accompanying drawings is not to be construed as limiting the disclosed methods to performing the steps in that order. Rather, the various steps of each of the methods disclosed herein can be performed in any of a variety of sequences. In addition, as the described methods are merely exemplary embodiments, various other methods that include additional steps or include fewer steps are also within the scope of the present disclosure.

The instruments disclosed herein can be constructed from any of a variety of known materials. Exemplary materials include those which are suitable for use in surgical applications, including metals such as stainless steel, titanium, nickel, cobalt-chromium, or alloys and combinations thereof, polymers such as PEEK, ceramics, carbon fiber, and so forth. The various components of the instruments disclosed herein can have varying degrees of rigidity or flexibility, as appropriate for their use. Device sizes can also vary greatly, depending on the intended use and surgical site anatomy. Furthermore, particular components can be formed from a different material than other components. One or more components or portions of the instrument can be formed from a radiopaque material to facilitate visualization under fluoroscopy and other imaging techniques, or from a radiolucent material so as not to interfere with visualization of other structures. Exemplary radiolucent materials include carbon fiber and high-strength polymers.

The devices and methods disclosed herein can be used in minimally-invasive surgery and/or open surgery. While the devices and methods disclosed herein are generally described in the context of spinal surgery on a human patient, it will be appreciated that the methods and devices disclosed herein can be used in any of a variety of surgical procedures with any human or animal subject, or in non-surgical procedures.

The devices disclosed herein can be designed to be disposed of after a single use, or they can be designed to be used multiple times. In either case, however, the device can be reconditioned for reuse after at least one use. Reconditioning can include any combination of the steps of disassembly of the device, followed by cleaning or replacement of particular pieces, and subsequent reassembly. In particular, the device can be disassembled, and any number of the particular pieces or parts of the device can be selectively replaced or removed in any combination. Upon cleaning and/or replacement of particular parts, the device can be reassembled for subsequent use either at a reconditioning facility, or by a surgical team immediately prior to a surgical procedure. Those skilled in the art will appreciate that reconditioning of a device can utilize a variety of techniques for disassembly, cleaning/replacement, and reassembly. Use of such techniques, and the resulting reconditioned device, are all within the scope of the present application.

The devices described herein can be processed before use in a surgical procedure. First, a new or used instrument can be obtained and, if necessary, cleaned. The instrument can then be sterilized. In one sterilization technique, the instrument can be placed in a closed and sealed container, such as a plastic or TYVEK bag. The container and its contents can then be placed in a field of radiation that can penetrate the container, such as gamma radiation, x-rays, or high-energy electrons. The radiation can kill bacteria on the instrument and in the container. The sterilized instrument can then be stored in the sterile container. The sealed container can keep the instrument sterile until it is opened in the medical facility. Other forms of sterilization known in the art are also possible. This can include beta or other forms of radiation, ethylene oxide, steam, or a liquid bath (e.g., cold soak). Certain forms of sterilization may be better suited to use with different portions of the device due to the materials utilized, the presence of electrical components, etc.

One skilled in the art will appreciate further features and advantages based on the above-described embodiments. Accordingly, the disclosure is not to be limited by what has been particularly shown and described. All publications and references cited herein are expressly incorporated herein by reference in their entirety.

What is claimed is:

1. A surgical method, comprising:
   inserting a flexible body of a flexible surgical access port through an incision in a patient's skin;
   advancing the flexible body through Kambin's triangle to a position adjacent to an intervertebral disc space of the patient;
   passing a surgical device through the flexible surgical access port, wherein movement of the surgical device through the flexible surgical access port causes the flexible surgical access port to both 1) elastically expand radially from a first configuration, and 2) move toward the first configuration after the surgical device has passed through; and performing a surgical procedure on the intervertebral disc space using the surgical device.

2. The method of claim 1, further comprising transmitting light along the flexible surgical access port through one or more fiber optics extending along a length of the flexible surgical access port.

3. The method of claim 1, further comprising monitoring loads imparted to tissue adjacent the flexible surgical access port using one or more sensors disposed along a length of the flexible surgical access port.

4. The method of claim 1, further comprising monitoring nerve health in tissue adjacent the flexible surgical access port using one or more wires extending along a length of the flexible surgical access port.

5. The method of claim 1, wherein the flexible surgical access port is woven.

6. The method of claim 1, wherein the flexible surgical access port is nonwoven.

7. The method of claim 1, wherein the surgical device comprises a camera.

8. The method of claim 1, further comprising removing a portion of a patient's vertebra using the surgical device.

9. The method of claim 1, further comprising clearing the intervertebral disc space using the surgical device.

10. The method of claim 1, wherein the passing step comprises passing a spinal fusion cage through the flexible surgical access port and into the intervertebral disc space through Kambin's triangle.

11. The method of claim 1, further comprising anchoring the flexible body to anatomical tissue.

12. The method of claim 1, further comprising the step of rolling the flexible body over a collar so as to adjust a length of the flexible body.

13. The method of claim 1, wherein the flexible body extends along a central axis, and a majority of the radial elastic expansion occurs at a first side of the central axis compared to a second side of the central axis that is opposite the first side.

14. The method of claim 13, further comprising anchoring the flexible body to anatomical tissue at only the second side of the central axis.

15. The method of claim 1, wherein the flexible surgical access port moves to the first configuration after the surgical device has passed through.

\* \* \* \* \*